US010719267B2

(12) United States Patent
Rai et al.

(10) Patent No.: US 10,719,267 B2
(45) Date of Patent: Jul. 21, 2020

(54) PARTIAL RESET OF MEMORY CONTROLLER

(71) Applicant: Western Digital Technologies, Inc., San Jose, CA (US)

(72) Inventors: Anindya Rai, Bangalore (IN); Jameer Babasaheb Mulani, Bangalore (IN); Devanathan Balasundaram, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 181 days.

(21) Appl. No.: 15/992,905

(22) Filed: May 30, 2018

(65) Prior Publication Data
US 2019/0369911 A1    Dec. 5, 2019

(51) Int. Cl.
*G06F 3/06*    (2006.01)

(52) U.S. Cl.
CPC ............ *G06F 3/0659* (2013.01); *G06F 3/061* (2013.01); *G06F 3/0604* (2013.01); *G06F 3/0679* (2013.01)

(58) Field of Classification Search
CPC ...... G06F 3/0659; G06F 3/0604; G06F 3/061; G06F 3/0679; G06F 12/00; G06F 13/00
USPC ................. 711/100, 103, 154, 200
See application file for complete search history.

(56) References Cited

U.S. PATENT DOCUMENTS 6,907,479 B2    6/2005  Karnstedt et al.
7,292,163 B1    11/2007 Fedele
8,341,342 B1 *  12/2012 Bonwick ............. G06F 11/1076
                                                  711/103
8,554,968 B1 *  10/2013 Onufryk ................ G06F 13/24
                                                  710/260
2005/0018514 A1    1/2005  Knaack et al.
2011/0053649 A1    3/2011  Wilson
2011/0179255 A1    7/2011  Pathirane et al.
2014/0331001 A1   11/2014  Liu et al.
2017/0060422 A1    3/2017  Sharifie et al.
2017/0075572 A1    3/2017  Utevsky et al.
2017/0083252 A1    3/2017  Sing et al.
2018/0024778 A1    1/2018  Singh et al.

OTHER PUBLICATIONS

NVM Express, "NVM Express over Fabrics," Revision 1.0, Jun. 5, 2016, 49 pages.
NVM Express, "NVM Express," Revision 1.3a, Oct. 24, 2017, 287 pages.

(Continued)

*Primary Examiner* — Tuan V Thai
(74) *Attorney, Agent, or Firm* — Vierra Magen Marcus LLP

(57) ABSTRACT

Technology is described herein that provides a partial reset of a non-volatile memory controller. In one aspect, a non-volatile memory controller persists memory addresses of I/O queues across a partial reset of the non-volatile memory controller. The non-volatile memory controller may also persist a mapping between each I/O submission queue and a corresponding I/O completion queue across the partial reset. Persisting the addresses of the I/O queues and/or mappings alleviates the need for a host system and non-volatile memory controller to perform a lengthy process of sharing the addresses of the I/O queues and/or mappings.

20 Claims, 12 Drawing Sheets

(56) References Cited

OTHER PUBLICATIONS

NVM Express, Inc., "NVM Express Revision 1.0e," [https://nvmexpress.org/resources/specifications], Jan. 23, 2019, pp. 1-127.
International Search Report & The Written Opinion of the International Searching Authority dated May 15, 2019, International Application No. PCT/US2019/016715.

* cited by examiner

PARTIAL RESET OF MEMORY CONTROLLER

BACKGROUND

The present disclosure relates to technology for non-volatile storage.

One type of non-volatile storage is semiconductor memory. For example, non-volatile semiconductor memory is used in solid state drives, mobile computing devices, non-mobile computing devices and other non-volatile memory devices. Typically, a non-volatile memory device has a memory controller which controls access of a host system to non-volatile storage (also referred to as non-volatile memory) in the non-volatile memory device. The host system could be computer system, cellular telephone, server, etc.

The host system and memory controller typically communicate using a logical device interface, which may also be referred to herein as a "memory access protocol." For example, NVMe (Non-Volatile Memory Express) is a logical device interface that may be used to access non-volatile storage when using a PCIe (Peripheral Computer Interconnect Express) bus between the host system and the non-volatile memory device. There are many other logical device interfaces that can be used between a host system and non-volatile memory device.

Prior to operation of the non-volatile memory device, the memory controller is initialized. The initialization process may establish values in various registers in the non-volatile memory device, as well as create Input/Output (I/O) queues. The I/O queues may include I/O command submission queues, on which the host places I/O commands, such as read and write commands. The I/O queues may include I/O command completion queues, on which the memory controller places responses to the I/O commands that were placed on the I/O command submission queues.

Herein, an I/O command submission queue is a queue on which a host places I/O commands in a non-volatile memory command set. Herein, an I/O command completion queue is a queue on which a non-volatile memory controller places a response to an I/O command. The I/O queues (both command submission queues and command completion queues) may be software queues. A software I/O queue, as the term is defined herein, is an I/O queue that resides in memory. The memory location of a given software I/O queue is not necessarily at a fixed location in the memory throughout the lifetime of the non-volatile memory device. This is in contrast to a hardware queue for which the queue location may be fixed throughout the lifetime of the non-volatile memory device. For example, a hardware queue might be implemented in a pre-established set of registers, in which case the queue location may be fixed throughout the lifetime of the non-volatile memory device.

DETAILED DESCRIPTION

Figure 1A:
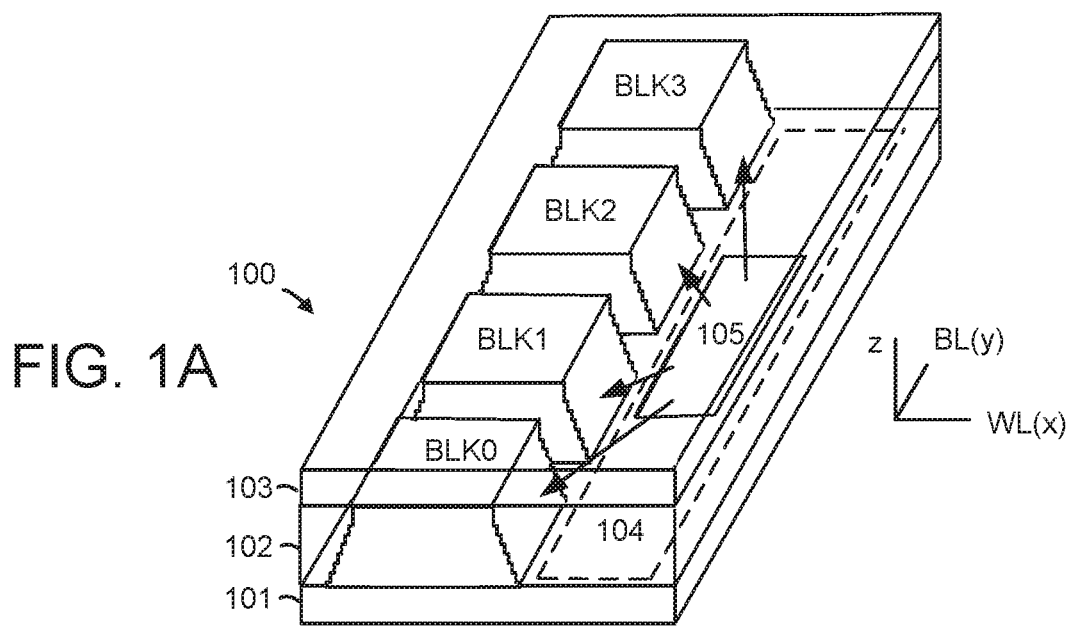
FIG. 1A is a perspective view of a set of blocks in a 3D stacked non-volatile memory device.

Technology is described herein that provides a partial reset of a non-volatile memory controller. The partial reset may be initiated from a host to the non-volatile memory controller. The partial reset may be performed at some point after the non-volatile memory controller was initialized. The partial reset brings the non-volatile memory controller to a partial reset state in which some initialization parameters are preserved. This alleviates the need to re-initialize some of the parameters. It can take a substantial amount of time to re-initialize some parameters. Hence, embodiments of a partial reset can save substantial time. The partial reset may also be referred to as a partial re-initialization.

In some embodiments, a non-volatile memory controller persists memory addresses of I/O queues across a partial reset of the non-volatile memory controller. To persist the memory addresses of the I/O queues across the partial reset means that the memory controller will use the same addresses for the I/O queues before and after the partial reset of the memory controller. Note that persisting the memory addresses of the I/O queues is in contrast to techniques that re-establish memory locations for the I/O queues after a reset of the memory controller. Persisting the addresses of the I/O queues alleviates the need for the host system and non-volatile memory controller to perform a lengthy process of sharing the memory locations of the I/O submission queues and I/O completion queues. For example, this can alleviate the need for the host system to send a separate command to the non-volatile memory controller for each I/O submission queue and a separate command to the non-volatile memory controller for each I/O completion queue.

The non-volatile memory controller may also persist a mapping between each of the I/O submission queues and a corresponding I/O completion queue across the partial reset. Persisting the mapping between I/O submission queue and the corresponding I/O completion queue across the partial reset alleviates the need for the host system and non-volatile memory controller to perform a lengthy process of sharing the mappings. For example, this can alleviate the need for the host system to send a separate command to the non-volatile memory controller for each mapping.

In some embodiments, a non-volatile memory controller persists certain features across a partial reset of the non-volatile memory controller. In one embodiment, the non-volatile memory controller persists an interrupt coalescing feature across the partial reset. The interrupt coalescing feature establishes rules for how/when the non-volatile memory controller is to write to an interrupt vector to indicate to the host system that the non-volatile memory controller has placed one or more command responses on a command completion queue.

Note that the partial reset may be performed for a variety of reasons. One trigger for the partial reset is an error in the non-volatile memory device. Embodiments of a partial reset successfully recover from the error, without the need to perform a lengthy initialization of the non-volatile memory controller. For example, the memory contents of the I/O queues may be initialized during the partial reset, which can help to recover from the error. Note the initializing the contents of the I/O queues may include setting the contents to a default state, such as all zeros. Other recovery steps can be performed such as initializing certain registers in the non-volatile memory device. In one embodiment, head pointers and tail pointers of the I/O queues are reset during the partial reset. Note that the head pointers and tail pointers could be indexes that identify a slot (or entry) on a queue. In one embodiment, "doorbell registers" in the non-volatile memory device are initialized during the partial reset, which can help to recover from the error. Note the initializing the doorbell registers may include setting the doorbell registers to a default state, such as all zeros. Note that a doorbell register may contain either a head pointer or a tail pointer for an I/O queue.

Note that other aspects of the I/O queues may persist across the partial reset. For example, the size of each I/O queue, the number of entry (or slot), and the size of each entry may all persist across the partial reset. Thus, in one embodiment, the I/O queues themselves persist across the partial reset, even though contents of the I/O queues and/or head and tail pointers may be cleared or reset.

In some cases, a non-volatile storage device may have more than one non-volatile memory controller. In such cases, each of the non-volatile memory controllers can be partially reset independent of the other non-volatile memory controllers, in one embodiment.

Technology described herein may be used with a variety of types of non-volatile memory. One example is a three-dimensional (3D) non-volatile memory device. However, embodiments may also be practiced in two-dimensional (2D) non-volatile memory device. FIG. 1A is a perspective view of a set of blocks in a 3D stacked non-volatile memory device 100. The non-volatile memory device 100 may also be referred to herein as a non-volatile memory system 100. The non-volatile memory device 100 includes a substrate 101. On the substrate are example blocks BLK0, BLK1, BLK2 and BLK3 of memory cells (storage elements) and a peripheral area 104 with circuitry for use by the blocks. For example, the circuitry can include voltage drivers 105 which can be connected to control gate layers of the blocks. In one approach, control gate layers at a common height in the blocks are commonly driven. The substrate 101 can also carry circuitry under the blocks, along with one or more lower metal layers which are patterned in conductive paths to carry signals of the circuitry. The blocks are formed in an intermediate region 102 of the memory device. In an upper region 103 of the memory system, one or more upper metal layers are patterned in conductive paths to carry signals of the circuitry. Each block comprises a stacked area of memory cells, where alternating levels of the stack represent control gate layers. In one possible approach, the control gate layers of each block at a common height are connected to one another and to a voltage driver. While four blocks are depicted as an example, two or more blocks can be used, extending in the x- and/or y-directions.

The length of the plane, in the x-direction, may represent a direction in which signal paths to word lines extend in the one or more upper metal layers (e.g., a word line or drain side select gate (SGD) line direction), and the width of the plane, in the y-direction, represents a direction in which signal paths to bit lines extend in the one or more upper metal layers (e.g., a bit line direction). The z-direction represents a height of the memory device.

Figure 1B:
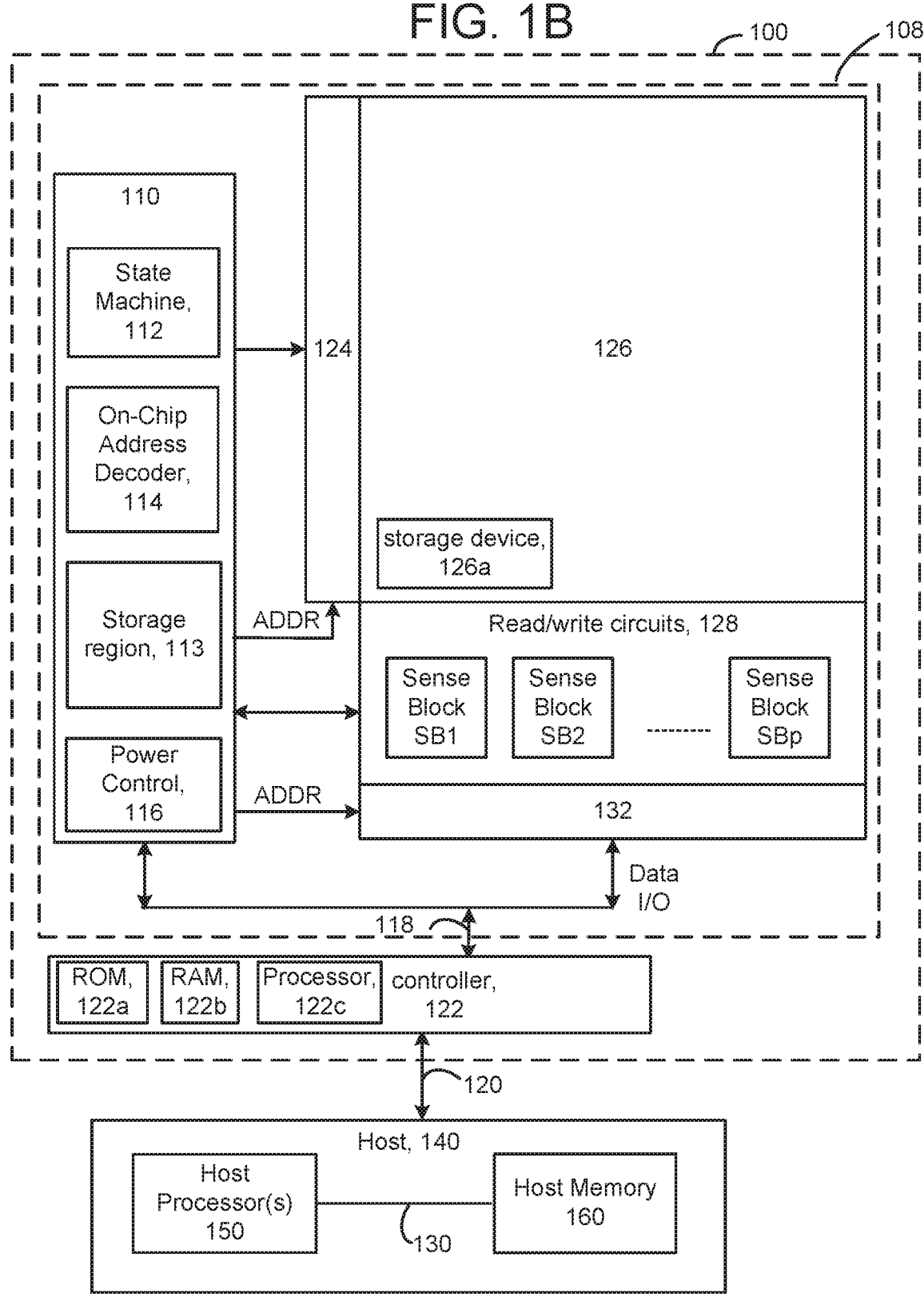
FIG. 1B is a functional block diagram of a memory device such as the 3D stacked non-volatile memory device of FIG. 1A, and a host system.

FIG. 1B is a functional block diagram of a non-volatile memory device such as the 3D stacked non-volatile memory device 100 of FIG. 1A, which is coupled to a host system. The functional block diagram may also be used for a 2D non-volatile memory device. Host system 140 has one or more host processors 150 and host memory 160. The one or more host processors 150 and host memory 160 may communicate over a bus 130. Host memory 160 may include, but is not limited to, Static Random Access Memory (SRAM) and Dynamic Random Access Memory (DRAM). Commands and data are transferred between the host system 140 and non-volatile memory controller 122 via an interface (e.g., data bus) 120 and between the memory controller and the one or more memory die 108 via lines 118. The interface 120 may also be referred to as a communication interface. Note that "non-volatile memory controller" 122 may be referred to herein more succinctly as "memory controller" or "controller".

The host 140 could be, but it not limited to, a smartphone, personal digital assistant (PDA), laptop computer, notebook computer, set top box, camera, or other electronic device. In one embodiment, the host 140 and memory system 100 reside in an automobile, and the host controls the automobile's electronic system. Host memory 160 may store software applications to run on host processor(s) 150 to implement functionality of a smartphone, personal digital assistant (PDA), laptop computer, notebook computer, set top box, camera, automobile's electronic system controller, or other electronic device.

In one embodiment, the host 140 controls different electronic control units (ECU) in an automobile (also referred to as vehicle). The ECUs may include one or more of an engine management ECU, transmission ECU, anti-lock braking ECU, traction control ECU, airbag ECU, and/or power steering ECU. In such a vehicular (also referred to as automotive) environment, the bus 130 may be a Controller Area Network (CAN) bus. A CAN bus is a vehicle bus standard that allows ECUs and other electronic devices to communicate with each other. Note that a Controller Area Network can be used in environments other than automobiles. Further note that an automotive environment is not limited to a Controller Area Network. In one embodiment, the automotive environment uses a Local Interconnect Network (LIN), which is a serial network protocol that allows communication between electronic components in vehicles (e.g., automobiles).

The interface 120 between the host system 140 and the memory system 100 may be any suitable interface. The interface 120 may include a mechanical and/or electrical connection between the host 140 and memory system 100. The mechanical and/or electrical connection may comply with a variety of form factors. The interface 120 may include a protocol for transferring signals over the mechanical and/or electrical connection. Examples for the interface 120 include, but are not limited to, Secure Digital (SD), Multi-MediaCard (MMC), embedded MultiMediaCard (eMMC), Universal Serial Bus (USB), Serial Advanced Technology Attachment (SATA), Fibre Channel, Small Computer Systems Interface (SCSI), Peripheral Component Interface (PCI), and PCI Express (PCIe). In one embodiment, the interface 120 includes a Peripheral Component Interconnect Express (PCIe) bus.

The memory system 100 and host system 140 communicate over the interface 120 using a logical device interface, which may also be referred to herein as a "memory access protocol." In one embodiment, the memory system 100 and host system 140 communicate over a PCIe bus based on a Non-Volatile Memory Express (NVMe) protocol. NVMe is a logical device interface that may be used to access non-volatile storage attached when using a PCIe bus between the host system 140 and the non-volatile memory device 100. However, note that the logical device interface is not limited to NVMe. Other possible logical device interfaces include, but are not limited to, Advanced Host Controller Interface (AHCI), SATA, SATA Express, MMC, eMMC, USB, Serial Attached SCSI (SAS), Fibre Channel Protocol (FCP), and Universal Flash Storage (UFS).

In one embodiment, the non-volatile memory system 100 may be a card based system, such as a secure digital (SD) or a micro secure digital (micro-SD) card. In an alternative embodiment, the non-volatile memory system 100 may be part of an embedded non-volatile memory device. For example, the non-volatile memory system 100 may be embedded within the host system 140, such as in the form of a solid state disk (SSD) drive installed in a personal computer.

The non-volatile memory device 100 may include one or more memory die 108. The set of blocks of FIG. 1A can be on one memory die 108. The memory die 108 includes a memory structure 126 of memory cells (e.g., non-volatile memory cells), such as an array of memory cells, control circuitry 110, and read/write circuits 128. In a 3D configuration, the memory structure can include the blocks of FIG. 1A. The memory structure 126 is addressable by word lines via a row decoder 124 and by bit lines via a column decoder 132. The read/write circuits 128 include multiple sense blocks SB1, SB2, SBp (sensing circuitry) and allow a page of memory cells to be read or programmed in parallel. Typically, a memory controller 122 is included in the same non-volatile memory device 100 (e.g., a removable storage card) as the one or more memory die 108.

Multiple memory elements in memory structure 126 may be configured so that they are connected in series or so that each element is individually accessible. By way of non-limiting example, flash memory systems in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The memory structure 126 can be two-dimensional (2D) or three-dimensional (3D). The memory structure 126 may comprise one or more arrays of memory elements (also referred to as memory cells). In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

One of skill in the art will recognize that this technology is not limited to the two dimensional and three dimensional exemplary structures described but covers all relevant memory structures within the spirit and scope of the technology as described herein and as understood by one of skill in the art.

The exact type of memory array architecture or memory cell included in memory structure 126 is not limited to the examples above. Many different types of memory array architectures or memory technologies can be used to form memory structure 126. No particular non-volatile memory technology is required for purposes of the new claimed embodiments proposed herein. Other examples of suitable technologies for memory cells of the memory structure 126 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

The memory elements can be formed from passive and/or active elements, in any combination. By way of non-limiting example, passive semiconductor memory elements include ReRAM device elements, which in some embodiments include a resistivity switching storage element, such as an anti-fuse or phase change material, and optionally a steering element, such as a diode or transistor. The phase change material may include a chalcogenide material. Further by way of non-limiting example, active semiconductor memory elements include EEPROM and flash memory device elements, which in some embodiments include elements containing a charge storage region, such as a floating gate, conductive nanoparticles, or a charge storage dielectric material.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a memory controller for memory read-write operations may be located on a separate controller chip and/or on the same substrate as the memory elements.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations. A storage region 113 may be provided for parameters for operating the memory device such as programming parameters for different rows or other groups of memory cells. These programming parameters could include bit line voltages and verify voltages.

The on-chip address decoder 114 provides an address interface between that used by the host or a memory controller to the hardware address used by the decoders 124 and 132. The power control module 116 controls the power and voltages supplied to the word lines and bit lines during memory operations. It can include drivers for word line layers (WLLs) in a 3D configuration, SGS and SGD select gates and source lines. The sense blocks can include bit line drivers, in one approach. A source side select gate (SGS) is a gate transistor at a source-end of a NAND string, and a drain side select gate (SGD) is a transistor at a drain-end of a NAND string.

In some implementations, some of the components can be combined. In various designs, one or more of the components (alone or in combination), other than memory structure 126, can be thought of as one or more control circuits which are configured to perform the actions described herein. For example, one or more control circuits may include any one of, or a combination of, control circuitry 110, state machine 112, decoders 114/124/132, power control module 116, sense blocks SB1, SB2, SBp, read/write circuits 128, memory controller 122, processor 122*c*, and so forth.

The memory controller 122 may comprise a processor 122*c* and storage devices (memory) such as read only memory (ROM) 122*a* and RAM 122*b*. RAM 122*b* may be, but is not limited to, SRAM and DRAM. The storage devices comprise code such as a set of instructions, and the processor is operable to execute the set of instructions to provide the functionality described herein. Alternatively or additionally, the processor can access code from a storage device region 126*a* of the memory structure, such as a reserved area of memory cells in one or more word lines.

The code is used by the memory controller 122 to access the memory structure 126 such as for programming, read and erase operations. The code can include boot code and control code (e.g., a set of instructions). The boot code is software that initializes the memory controller during a booting or startup process and enables the memory controller to access the memory structure. The code can be used by the memory controller to control one or more memory structures. Upon being powered up, the processor 122*c* fetches the boot code from the ROM 122*a* or storage device region 126*a* for execution, and the boot code initializes the system components and loads the control code into the RAM 122*b*. Once the control code is loaded into the RAM 122*b*, it is executed by the processor 122*c*. The control code includes drivers to perform basic tasks such as controlling and allocating memory, prioritizing the processing of instructions, and controlling input and output ports.

Figure 2A:
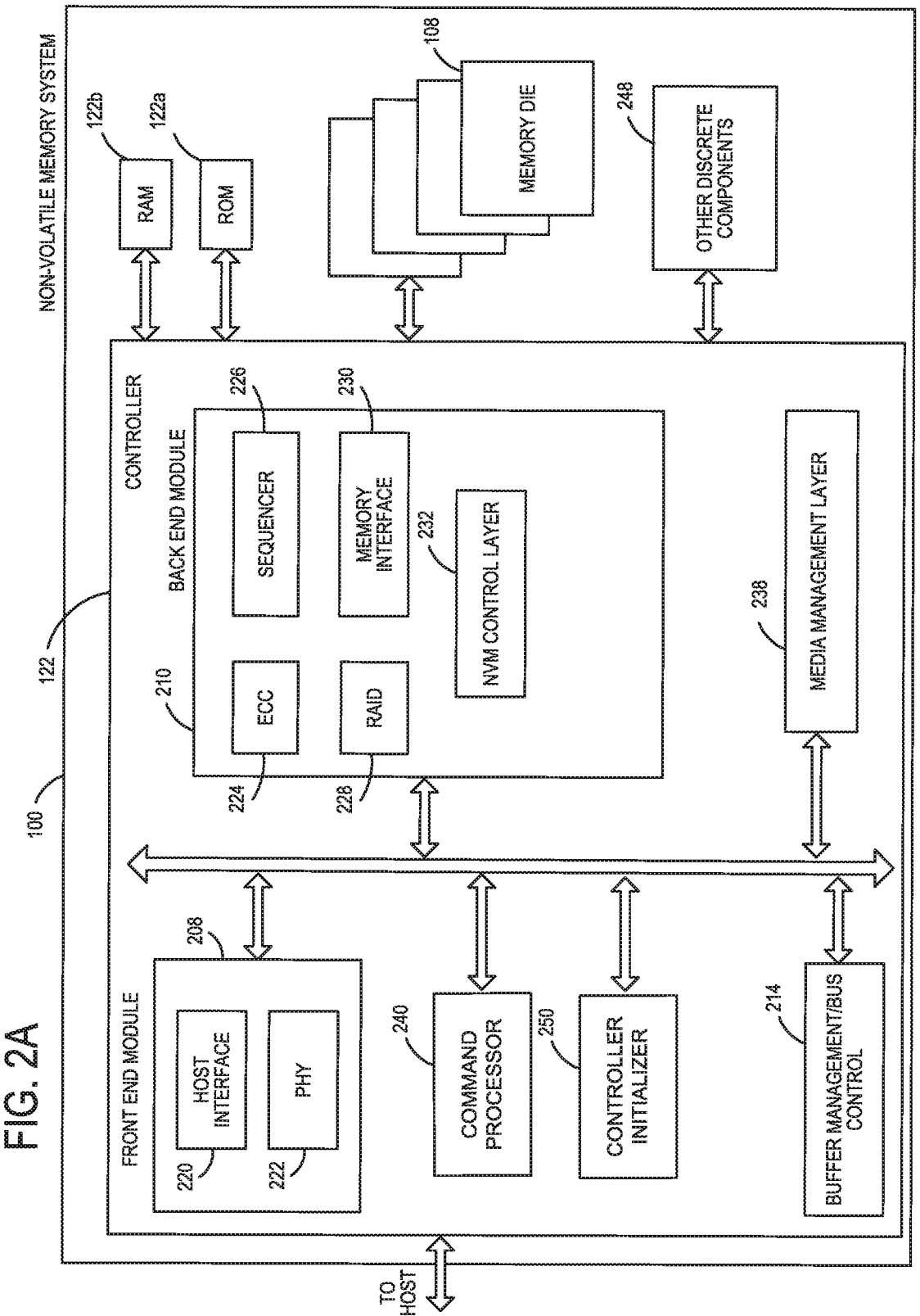
FIG. 2A is a block diagram of example memory system, depicting more details of one embodiment of memory controller.

FIG. 2A is a block diagram of example memory system 100, depicting more details of one embodiment of memory controller 122. As used herein, a memory controller is a device that manages data stored on memory and communicates with a host, such as a computer or electronic device. In one embodiment, the memory controller is a flash memory controller. However, the memory controller is not limited to flash memory controller. For example, the non-volatile memory in the memory die 108 may contain phase change memory. A memory controller can have various functionality in addition to the specific functionality described herein. For example, the memory controller can format the memory to ensure the memory is operating properly, map out bad memory cells, and allocate spare memory cells to be substituted for future failed cells. Some part of the spare cells can be used to hold firmware to operate the memory controller and implement other features. In operation, when a host needs to read data from or write data to the memory, it will communicate with the memory controller. If the host provides a logical address to which data is to be read/written, the memory controller can convert the logical address received from the host to a physical address in the flash memory. (Alternatively, the host can provide the physical address). The memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between memory controller 122 and non-volatile memory die 108 may be any suitable memory interface, such as Toggle Mode 200, 400, or 800 in a flash memory interface. In one embodiment, memory system 100 may be a card based system, such as a secure digital (SD) or a micro secure digital (micro-SD) card. In an alternate embodiment, memory system 100 may be part of an embedded memory system. For example, the memory may be embedded within the host. In other example, memory system 100 can be in the form of a solid state drive (SSD) drive.

In some embodiments, non-volatile memory system 100 includes a single channel between memory controller 122 and non-volatile memory die 108, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2A, memory controller 122 includes a front end module 208 that interfaces with a host, a back end module 210 that interfaces with the one or more non-volatile memory die 108, and various other modules that perform functions which will now be described in detail.

The memory controller 122 may be configured to implement a memory access protocol, such as an NVMe protocol. In some embodiments, the memory controller 122 is configured to implement an extension to an NVMe protocol that provides for a partial reset of the memory controller 122.

The command processor 240 accesses commands that are provided by the host, parses the commands, and initiates execution of the commands. The commands may include I/O commands (e.g., read, write). The command processor 240 communicates with the back end module 210 to execute the I/O commands.

The controller initializer 250 handles initialization of the memory controller 122. The initialization process may establish values in various registers in the non-volatile memory system 100, as well as create Input/Output (I/O) queues. The I/O queues may include I/O command submission queues, on which the host places I/O commands, such as read and write commands. The I/O queues may include I/O command completion queues, on which the memory controller 122 places responses to the I/O commands that were placed on the I/O command submission queues. In one embodiment, during initialization, the host sends commands to the memory controller 122 that specify addresses of the I/O queues. The commands may also specify a mapping between I/O completion queues and I/O submission queues.

The controller initializer 250 is configured to manage a partial reset of the memory controller 122, in one embodiment. The partial reset may be initiated from the host. The partial reset may be performed at some point after the non-volatile memory controller 122 was initialized. The partial reset brings the non-volatile memory controller 122 to a partial reset state in which some initialization parameters are preserved. The partial reset may also be referred to as a partial re-initialization. The partial re-initialization may save substantial time relative to an initialization that, for example, creates I/O queues. For example, during one embodiment of a partial re-initialization, the host does not need to send commands to the memory controller 122 to specify addresses of the I/O queues. Also, during one embodiment of a partial re-initialization, the host does not need to send commands to the memory controller 122 to specify a mapping between I/O completion queues and I/O submission queues.

The components of memory controller 122 depicted in FIG. 2A may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for memory controller 122 to perform the functions described herein.

Referring again to modules of the memory controller 122, a buffer manager/bus control 214 manages buffers in random access memory (RAM) 122b and controls the internal bus arbitration of memory controller 122. A read only memory (ROM) 122a stores system boot code. Although illustrated in FIG. 2A as located separately from the memory controller 122, in other embodiments one or both of the RAM 122b and ROM 122a may be located within the controller. In yet other embodiments, portions of RAM and ROM may be located both within the memory controller 122 and outside the controller. Further, in some implementations, the memory controller 122, RAM 122b, and ROM 122a may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, Serial Advanced Technology Attachment (SATA), SATA Express, Serial Attached SCSI (SAS), Fibre Channel, Universal Serial Bus (USB), Peripheral Computer Interconnect express (PCIe), and Novvolatile Memory Express (NVMe). The host interface 220 typically facilitates transfer for data, control signals, and timing signals.

Back end module 210 includes an error correction code (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A non-volatile memory (NVM) control layer 232 controls the overall operation of back end module 210. In one embodiment, NVM control layer 232 is a flash control layer.

Additional components of system 100 illustrated in FIG. 2A include media management layer 238, which performs wear leveling of memory cells of non-volatile memory die 108. System 100 also includes other discrete components 248, such as external electrical interfaces, external RAM, resistors, capacitors, or other components that may interface with memory controller 122. In alternative embodiments, one or more of the physical layer interface 222, RAID module 228, media management layer 238 and buffer management/bus controller 214 are optional components that are not necessary in the memory controller 122.

The Media Management Layer (MML) 238 (which in one embodiment is a Flash Translation Layer (FTL)) may be integrated as part of the memory cell management that may handle memory cell errors and interfacing with the host. For example, MML may be a module in flash management and may be responsible for the internals of NAND management. In particular, the MML 238 may include an algorithm in the memory device firmware which translates writes from the host into writes to the memory structure 126 of die 108. The MML 238 may be needed because: 1) the memory may have limited endurance; 2) the memory structure 126 may only be written in multiples of ECC pages; and/or 3) the memory structure 126 may not be written unless it is erased as a block. The MML 238 understands these potential limitations of the memory structure 126 which may not be visible to the host. Accordingly, the MML 238 attempts to translate the writes from host into writes into the memory structure 126.

Memory controller 122 may interface with one or more memory dies 108. In one embodiment, memory controller 122 and multiple memory dies (together comprising non-volatile memory system 100) implement a solid state drive (SSD), which can emulate, replace or be used instead of a hard disk drive inside a host, as a Network Attached Storage (NAS) device, laptop, tablet, etc. Additionally, the SSD need not be made to work as a hard drive.

Figure 2B:
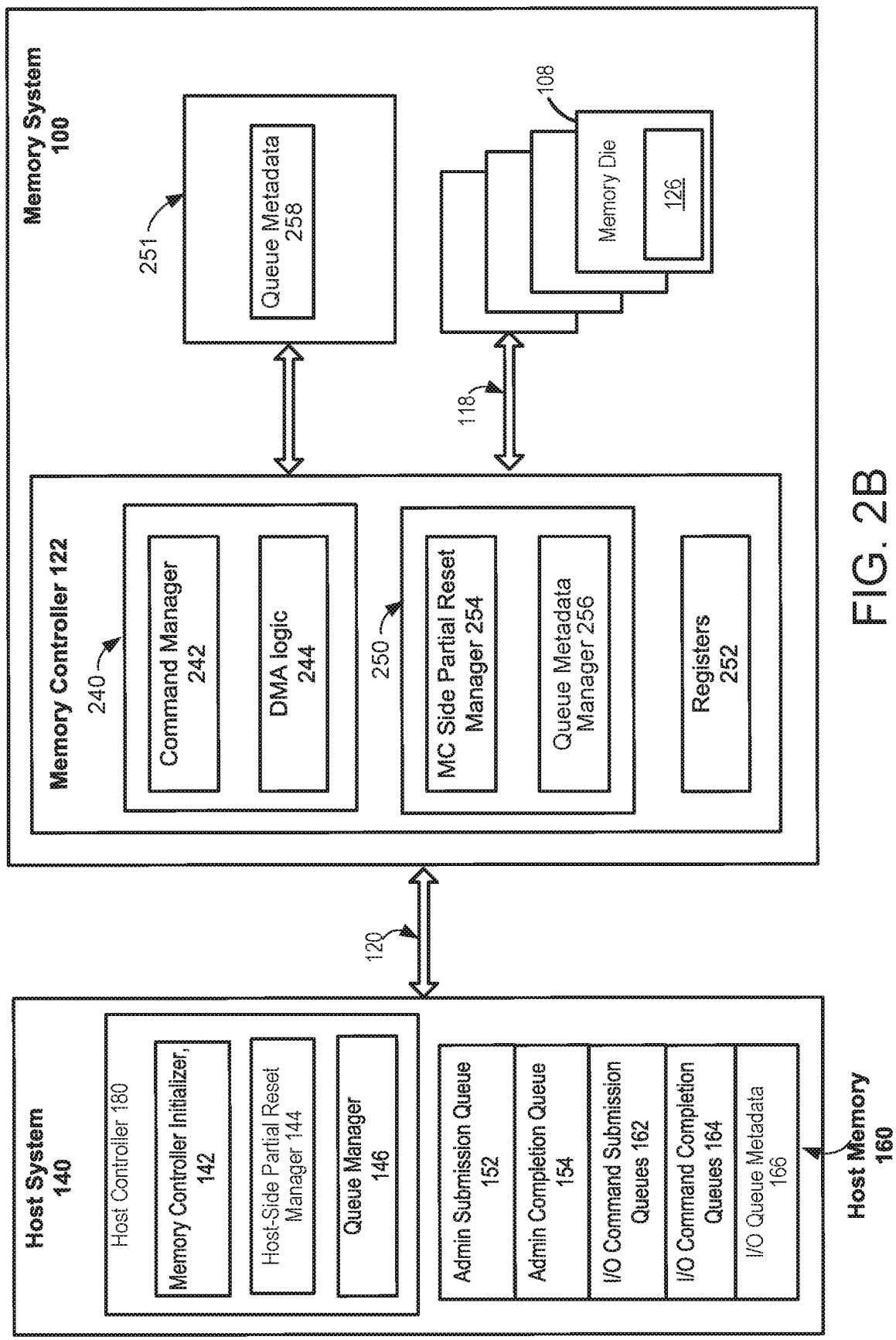
FIG. 2B is a block diagram of example non-volatile memory system and host system.

FIG. 2B is a block diagram of example non-volatile memory system 100 and host system 140. In one embodiment, the system of FIG. 2B is a solid state drive. In one embodiment, the host system 140 may use host memory 160 to store an admin submission queue 152, an admin completion queue 154, one or more I/O command submission queues (SQs) 162 and one or more I/O command completion queues (CQs) 164. Note that the reference numeral 162 will be used herein whether referring to a specific SQ or the SQs in general. Likewise, the reference numeral 164 will be used herein whether referring to a specific CQ or the CQs in general. Further, the term "I/O queue" may be used as a general term to refer to the SQs 162 and CQs 164.

The admin submission queue 152 and admin completion queue 154 may be used to control and manage the memory controller 122. For example, the host controller 180 may place administrative commands on the admin submission queue 152. In one embodiment, the admin submission queue 152 and admin completion queue 154 are an NVMe admin submission queue and admin completion queue, respectively.

The host controller 180 places I/O commands onto the SQs 162. The I/O commands include commands to access the memory structure 126 in the memory die 108. For example, an I/O command might be to read from or write to the memory structure 126. In one embodiment, an SQ 162 is a circular buffer with a fixed size slot. In one embodiment, the host informs the non-volatile memory device when a new command has been placed on an SQ 162. One such mechanism is referred to herein as a "doorbell." The "doorbell" refers to a register in the memory controller 122, which is referred to as a "doorbell register." In one embodiment, SQs 162 and CQs 164 are NVMe command submission queues and command completion queues, respectively.

The memory controller 122 may write to an associated CQ 164 to post status for completed commands. In one embodiment, a CQ 164 is a circular buffer with a fixed size slot. The term "queue," as used herein (including, but not limited to admin submission queue 152, admin completion queue 154, SQs 162 and CQs 164) means non-transitory storage containing a data structure. The non-transitory storage could be, for example, host memory 160, RAM 122b, memory structure 126, etc. Thus, the admin submission queue 152, admin completion queue 154, SQs 162 and CQs 164 are software queues, in some embodiments.

The host memory 160 may also be used to store I/O queue metadata 166. The I/O queue metadata 166 is data about the admin queues 152, 154, SQs 162, and CQs 164. The I/O queue metadata 166 may include the addresses of the various queues 152, 154, 162, 164. In one embodiment the addresses are in host memory 160. Note that one or more of the queues 152, 154, 162, 164 could be located in memory on the memory system 100 (see, for example, FIG. 2C). The I/O queue metadata could include the size of each queue. For example, there may be a base address and size for a given queue. Note that a given queue is not required to be contiguous in the host memory 160. Thus, there could be multiple pointers to locations in host memory 160 for a given queue.

The I/O queue metadata 166 may also contain an identifier for each queue. In one embodiment, the Admin Queues 152, 154 are each assigned the identifier of "0". The I/O queue metadata 166 may also contain a mapping between SQs 162 and CQs 164. In one embodiment, each SQ 162 is mapped to a CQ 164. This is used to specify what CQ 164 the memory controller 122 should place command responses for commands from a given SQ 162. Note that the "command responses" may also be referred to as "command status." In one embodiment, multiple SQs 162 can mapped to the same CQ 164.

The I/O queue metadata 166 may also specify an interrupt vector for a CQ 164. In one embodiment, each CQ 164 is associated with an interrupt vector. The memory controller 122 may write to the interrupt vector associated with a CQ 164 upon placing one or more command responses on the CQ. Note that a given interrupt vector could be associated with more than one CQ 164.

The I/O queue metadata 166 may also contain head pointers and tail pointers for the queues 152, 154, 162, 164, which may be maintained by the queue manager 146. In one embodiment, a head pointer is an index that specifies a slot or entry of a queue. Likewise, in one embodiment, a tail pointer is an index that specifies a slot or entry of a queue.

The tail pointer for the admin submission queue 152 may point to the last administrative command that the host 140 placed on the admin submission queue 152. The head pointer for the admin submission queue 152 may be used to track the next free slot on the admin submission queue 152. The tail pointer for the admin completion queue 154 may point to the last response to an administrative command that the memory controller placed on the admin completion queue 154. The head pointer for the admin completion queue 154 may be used to track the next free slot on the admin completion queue 154.

The tail pointer for an SQ 162 may point to the last I/O command that the host 140 placed on the SQ 162. The head pointer for SQ 162 may be used to track the next free slot on the SQ 162. The tail pointer for a CQ 164 may point to the last response to an I/O command that the memory controller placed on the CQ 164. The head pointer for the CQ 164 may be used to track the next free slot on the CQ 164.

In some embodiments, the memory controller 122 sends an interrupt message to inform the host 140 that one or more command responses have been placed on a CQ 164. The interrupt message may specify an interrupt vector. The contents of the interrupt message may vary depending on the implementation. For example, the interrupt message contains an address and data which together trigger an interrupt, in one embodiment. The combination of the address and data make up an "interrupt vector," in one embodiment. In one embodiment, the interrupt messages are MSI (Message Signaled Interrupts). In one embodiment, the interrupt messages are MSI-X (which is an extension to MSI). Note that "writing to an interrupt vector," as the phrase is used herein, may be achieved by the memory controller 122 sending an interrupt message such as an MSI or MSI-X message.

Note that a portion of host memory 160 may be used for data buffers in which the host system 140 may store host data to be written to the memory structure 126. Also, the memory controller 122 may store host data that was read from the memory structure 126 into the data buffers in host memory 160. However, this portion of host memory 160 has not been depicted in FIG. 2A.

The host system 140 has a host controller 180. A host controller 180, as the term is used herein, is a device that communicates with a non-volatile memory controller 122 in order to access non-volatile memory, which is under the control of the non-volatile memory controller 122. Host controller 180 may be configured to implement host controller functions of a memory access protocol, including but not limited to NVMe. Note that host controller 180 may be configured to implement techniques which may be extensions to a memory access protocol such as NVMe.

The host controller 180 has a queue manager 146, which may be configured to manage the admin submission queue 152, admin completion queue 154, SQs 162, and CQs 164. The queue manager 146 is configured to allocate memory in host memory 160 for the queues 152, 154, 162, 164, in one embodiment. As noted above, one or more of the queues 152, 154, 162, 164 could be located in memory in the memory system 100. In this case, the queue manager 146 may be configured to allocate memory in the memory system 100 for one or more of the queues 152, 154, 162, 164, in one embodiment. The queue manager 146 is configured to maintain head pointers and tail pointers of the queues 152, 154, 162, 164, in one embodiment.

The host controller 180 has a memory controller initializer 142, which may be configured to initialize the memory controller 122. The memory controller initializer 142 may work in combination with the queue manager 146 to perform one or more of the following during initialization. A portion of host memory 160 may be allocated for the admin submission queue 152 and admin completion queue 154. The memory controller initializer 142 may place administrate commands on the admin submission queue 152 to establish various settings for the memory controller 122, as well as to learn the configuration of the memory controller 122. The host system 140 may allocate an appropriate number of SQs 162 and CQs 164 based on the configuration of the memory controller 122, number of queues supported by the memory controller 122, as well as other factors. For example, the host system 140 may allocate portions of host memory 160 for SQs 162 and CQs 164. The memory controller initializer 142 may send addresses of the SQs 162 and CQs 164 to the memory controller 122.

The host controller 180 has a host-side partial reset manager 144, which is configured to manage a partial reset of the memory controller 122. In one embodiment, the host-side partial reset manager 144 sends a hardware reset to the memory controller 122. The host-side partial reset manager 144 writes a specific register in the memory controller 122 to trigger the partial reset, one embodiment. The host-side partial reset manager 144 sends a command (e.g., partial reset command) to the memory controller 122 to trigger the partial reset, in one embodiment. This partial reset command may be placed on the admin submission queue 152, as one example. The partial reset command is a vendor-specific command in a memory access protocol, in one embodiment. The partial reset command is a vendor-specific command in an NVMe protocol, in one embodiment.

The host-side partial reset manager 144 may also handle certain tasks on the host system 140 such as resetting the memory contents of the SQs 162 and CQs 164 in the host memory 160 upon a partial reset of the memory controller 122. The host-side partial reset manager 144 may also reset contents of the admin queue 152 and/or admin completion queue upon certain embodiments of a partial reset of the memory controller 122. The host-side partial reset manager 144 may preserve at least some of the I/O queue metadata 166 upon a partial reset of the memory controller 122. Thus, although the contents of the SQs 162 and CQs 164 are reset, in one embodiment, the locations of the SQs 162 and CQs 164 remain the same. Note that the memory controller 122 may save the locations of the SQs 162 and CQs 164, as will be described below. Therefore, the memory controller 122 need not be informed of the location of the SQs 162 and CQs 164 after a partial reset of the memory controller 122, which can save considerable time.

The memory controller initializer 142, host-side partial reset manager 144, and queue manager 146 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include or comprise software stored in a processor readable device (e.g., host memory 160) to program one or more processors 150 to perform the functions described herein.

The memory controller 122 shows further details of one embodiment of the command processor 240. The memory controller 122 shows further details of one embodiment of the controller initializer 250. The memory controller 122 also has a number of registers 252.

The registers 252 may be used to store information used to facilitate implementation of a memory access protocol (such as, but not limited to, NVMe). The registers 252 may be used to store information used to facilitate implementation of a bus transfer protocol, such as PCIe registers. The host system 140 may have access to one or more of the registers 252. There may be an Admin Submission Queue Base Address Register, which the host system 140 may write to in order to provide the base address of Admin Submission Queue 152. There may be an Admin Completion Queue Base Address Register, which the host system 140 may write to in order to provide the base address of Admin Completion Queue 154.

The registers 252 may include a number of "doorbell registers." Herein, a "doorbell register" is a register that is written to by either the host 140 or the memory controller 122 to inform the other that there is a new entry on an admin submission queue 152, admin completion queue 154, SQ 162 or CQ 164. Note that the registers 252 may be implemented with any type of storage. For example, some or all of the registers 252 may be implemented with flip-flops. However, some or all of the registers 252 could be implemented in RAM 122b (e.g., SRAM, DRAM). Some of all of the registers 252 may be implemented in memory cells in structure 126 (e.g., storage device region 126a). The doorbell registers may also be referred to as "doorbell storage."

The doorbell registers include a set of submission queue tail doorbell registers, in one embodiment. Each submission queue tail doorbell register pertains to either the admin submission queue 152 or one of the SQs 162, in one embodiment. A "submission queue tail doorbell register" (which may also be referred to as a "submission queue doorbell register") is written to by the host 140 to inform the memory controller 122 that the host 140 has placed one or more commands on the associated admin submission queue 152 or SQ 162, in one embodiment.

The doorbell registers include a set of completion queue head doorbell registers, in one embodiment. Each completion queue head doorbell register pertains to either the admin completion queue 154 or one of the CQs 164, in one embodiment. A "completion queue head doorbell register" (which may also be referred to as a "completion queue doorbell register") is written to by the memory controller 122 to inform the host 140 that the memory controller 122 has placed one or more command responses on the associated admin completion queue 154 or CQ 164, in one embodiment. Note that the host 140 does not need to poll the completion queue doorbell registers to learn about new command responses, in one embodiment. Instead, the memory controller 122 sends an interrupt to the host 140 to notify that one or more command response have been placed on, for example, a CQ 164. The registers 252 are not required to contain all of the just described functionality. Also, there may be many other type of registers 252 not expressly described herein.

The command processor 240 includes a command manager 242 and DMA logic 244. The command manager 242 is configured to fetch and parse commands from SQs 162. The command manager 242 may also queue the commands internally (i.e., within the memory controller 122) for execution. In one embodiment, the command manager 242 determines when to send a command from the internal queue (within the memory controller 122) to a command executer within a backend module of the memory controller. In one embodiment, the command manager 242 also sends an indication to the host system 140 when a command is complete. For example, the command manager 242 could store command responses on a CQ 164 when a command (such as a read or write command) is complete. The command manager 242 may write to an interrupt vector after it places one or more command responses on a CQ 164.

The command manager 242 is also configured to fetch and parse commands from the admin submission queue 152. In one embodiment, one of the commands that is fetched is for the memory controller 122 may be referred to as a "create I/O queue command." The create I/O queue command contains metadata about either an SQ 162 or a CQ 164, in one embodiment. The metadata may include one or more of the following: the memory location(s) of a queue, size of the queue, identifier of the queue, identifier of an SQ 162 associated with a CQ 164, and/or interrupt vector to write to after placing one or more command responses on a CQ 164. The command manager 242 stores this metadata as queue metadata 258, in one embodiment.

DMA logic 244 is configured to control DMA transfer of data between the non-volatile memory device 100 and the host memory 160 in the host system 140.

The initializer 250 has a MC (Memory Controller) side partial reset manager 254 and queue metadata manager 256. The MC side partial reset manager 254 is configured to manage a partial reset of the memory controller 122, in one embodiment. In one embodiment, the MC side partial reset manager 254 resets head and tail pointers of the I/O queues 162, 164 that the memory controller 122 uses. These pointers are typically located on the memory system 100, such as in the registers 252. The MC side partial reset manager 254 resets doorbell registers (in registers 252) to reset the head and tail pointers of the I/O queues 162, 164, in one embodiment.

The queue metadata manager 256 is configured to store queue metadata 258 in storage 251. The queue metadata 258 contains information about SQs 162 and CQs 164, in one embodiment. The queue metadata manager 256 may store metadata about the SQs 162 and CQs 164 in queue metadata 258 when the memory controller 122 is initialized. For example, host 140 may pass memory address of the SQs 162 and CQs 164 to the memory controller 122 during initialization, wherein queue metadata manager 256 may store the memory address of the SQs 162 and CQs 164 as queue metadata 258 in storage 251. In one embodiment, the memory addresses of the SQs 162 and CQs 164 are addresses in host memory 160.

The queue metadata 258 may include an identifier for each queue. The I/O queue metadata 258 may also contain a mapping between SQs 162 and CQs 164. The queue metadata 258 may also specify an interrupt vector for a CQ 164. In one embodiment, the interrupt vectors are stored in registers 252.

The queue metadata 258 may also contain head pointers and tail pointers for the queues 152, 154, 162, 164. One embodiment of the head pointers and tail pointers have been described with respect to the I/O queue metadata 166 in host memory 160. Note that the queue metadata manager 256 may maintain copies of the head pointers and tail pointers for the queues 152, 154, 162, 164 independent of the copies in the host memory 160.

Storage 251 could be implemented in volatile memory (e.g., RAM 122b of FIG. 2A) or non-volatile memory (e.g., memory structure 126). In one embodiment, at least a portion of storage 251 is implemented in registers 252. For example, interrupt vectors could be implemented in registers 252. Also, doorbell registers may be used to contain tail pointers to SQs 162, as well as head pointers to CQs 164. However, note that the memory controller 122 could maintain copies of the tail pointers to SQs 162, as well as head pointers to CQs 164, independent of the doorbell registers. In one embodiment, a copy of the queue metadata 258 is stored in non-volatile memory, such that the queue metadata 258 will persist in the event that power is lost.

The components of memory controller 122 depicted in FIG. 2B may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that inter-faces with a larger system, for example. For example, all or a portion of each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or additionally, all or a portion of each module may include or comprise software stored in a processor readable device (e.g., memory) to program a one or more processors for memory controller 122 to perform the functions described herein. The architecture depicted in FIG. 2B is one example implementation that may (or may not) use the components of memory controller 122 depicted in FIG. 1B (e.g., RAM 122b, ROM 122a, processor 122c).

Figure 2C:
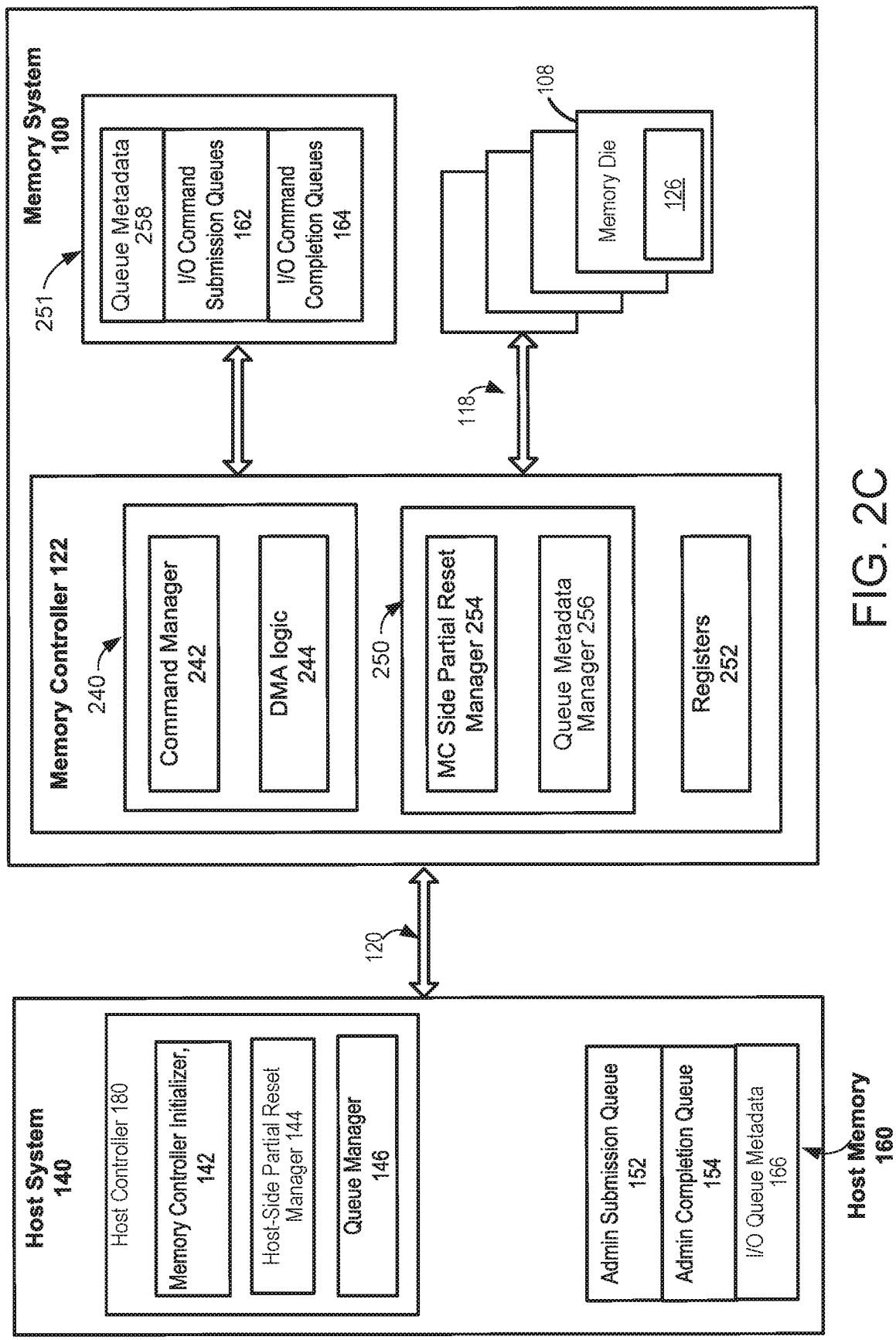
FIG. 2C is a diagram of another embodiment of a non-volatile memory device and host system.

FIG. 2C is a diagram of another embodiment of a non-volatile memory device 100 and host system 140. In this embodiment, SQs 162 and CQs 164, are stored in storage 251 in non-volatile memory device 100. The admin submission queue 152 and admin completion queue 154 could also be stored in storage 251 on the non-volatile memory device 100, but are depicted in host memory 160. The SQs 162 and CQs 164 may be stored in volatile memory (e.g., RAM 122b) or non-volatile memory (e.g., memory structure 126). For example, the SQs 162 and CQs 164 can be stored in flash memory cells in a memory array. The portion of storage that stores the SQs 162 and CQs 164 (and optionally admin submission queue 152 and admin completion queue 154) may be referred to as a controller memory buffer (CMB).

The submission queues (SQs) 162 in the non-volatile memory device 100 allow the host system 140 to directly write commands to the memory controller's internal memory space, in one embodiment. This alleviates the need for the memory controller 122 to access commands from the host memory 160. CMB based SQs 162 and CQs 164 (and optimally admin submission queue 152 and admin completion queue 154) may be used in a similar manner when the queues are stored in host memory 160 the host system 140. A difference being that the memory controller's memory space is used instead of the host memory 160.

In one embodiment, the host controller 180 establishes the I/O queues 162, 164 in storage 251. The I/O queue metadata 166 may include the addresses of the admin queues 152, 154 in host memory 160, as well as addresses of I/O queues 162, 164 in storage 251. The I/O queue metadata could include the size of each queue. The I/O queue metadata 166 may also contain an identifier for each queue. The I/O queue metadata 166 may also contain a mapping between SQs 162 and CQs 164. The I/O queue metadata 166 may also specify an interrupt vector for a CQ 164.

The host controller 180 provides at least some of the I/O queue metadata 166 to the memory controller, which may be stored as queue metadata 258. For example, the host 140 may provide the addresses of the of I/O queues 162, 164 in storage 251 to the memory controller 122. The host 140 may provide the mapping between SQs 162 and CQs 164 to the memory controller 122. The host 140 may provide an interrupt vector for each CQ 164 to the memory controller.

Other variations to the embodiments depicted in FIGS. 2B and 2C are possible. For example, any subset of the admin submission queue 152, admin completion queue 154, and SQs 162, CQs 164, may be stored in the non-volatile memory device 100. Also, the number of queues of each type can vary in accordance with implementation. For example, although a single admin submission queue 152 and a single admin completion queue 154 was described with respect to FIGS. 2B and 2C, there could be multiple admin submission queues 152 and/or multiple admin completion queues 154, in some embodiments. For example, the memory system 100 can have multiple NVMe controllers, with a separate set of admin queues 152, 154 for each NVMe controller. Also, although multiple SQs 162 and a multiple CQs 164 were described with respect to FIGS. 2B and 2C, there could be a single SQ 162 and/or a single CQ 164, in some embodiments.

FIGS. 2A, 2B, and 2C each show a non-volatile memory system 100 having one non-volatile memory controller. In such embodiments, the non-volatile memory system 100 has more than one non-volatile memory controller. For example, in NVMe, there may be more than one NVMe controller in a memory system 100. When there are more than one non-volatile memory controller in a non-volatile memory system 100 each of the non-volatile memory controllers can be partially reset independent of the other non-volatile memory controllers, in one embodiment.

Figure 3:
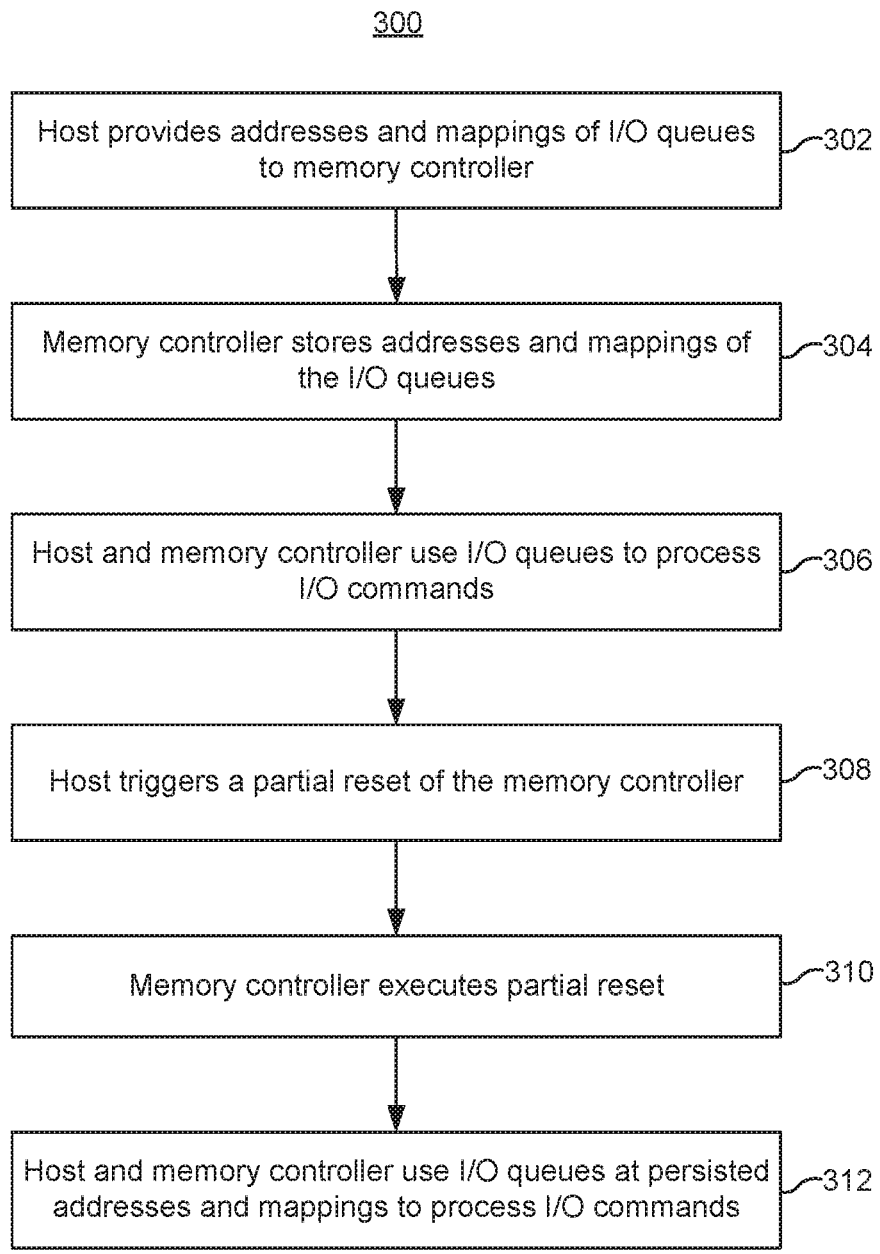
FIG. 3 is a flowchart of one embodiment of a process of operating non-volatile storage.

FIG. 3 is a flowchart of one embodiment of a process 300 of operating non-volatile storage. In one embodiment, some or all steps of process 300 are performed in a system such as FIG. 1B, 2A, 2B, or 2C. Some of the steps of process 300 may be performed by host system 140 (e.g., by host controller 180), with others performed by memory system (e.g., by memory controller 122). In one embodiment, process 300 is performed separately for each non-volatile memory controller 122 in a memory system 100.

The process 300 begins in response to an initialization of the non-volatile memory controller 122. Note that when process 300 begins none of the I/O queues 162, 164 have been created. Likewise, the admin queues 152, 154 have not yet been created. In one embodiment, the initialization of the memory controller 122 is based on an NVMe protocol. However, the initialization phase is not limited to NVMe. The initialization may be performed after a power on reset of the memory system 100. The initialization may be used to establish values in registers such as PCIe registers. The initialization may be used to create a number of SQs 162 and CQs 164.

Step 302 includes the host 140 providing memory addresses and mappings of I/O queues to the memory controller 122. In one embodiment, the host 140 provides memory addresses of SQs 162 and CQs 162 in host memory 160. In one embodiment, the host 140 provides memory addresses of SQs 162 and SQs 162 in storage 251 on the memory system 100. In one embodiment, the memory addresses of SQs 162 are provided in NVMe create I/O submission queue commands. In one embodiment, the memory addresses of CQs 162 are provided in NVMe create I/O completion queue commands.

Note that to provide memory addresses of I/O queues means to provide sufficient information to specify the entire memory location of a given I/O queue. For example, the host 140 might provide a base address and a length of an I/O queue that is contiguous in memory. In the event that an I/O queue is not contiguous in memory, then the information that the host 140 provides might include a number of pointers to memory buffers of some fixed size, as one example. Other techniques may be used to specify the entire memory location of a given I/O queue.

Step 302 also includes the host 140 providing mappings between the SQs 162 and the CQs 164. Each SQ 162 is mapped to a CQ 164 in one embodiment. The mapping between an SQ 162 and a CQ 164 may be referred to as an I/O queue pair. Note that multiple SQs 162 may be mapped to the same CQ 164, in one embodiment. The mapping tells the memory controller 122 which CQ 164 should be used to place a command response for an I/O command that the host placed on an SQ 162.

Step 304 includes the memory controller 122 storing the memory addresses and the mappings of the I/O queues 162, 164. The memory controller 122 stores the addresses and mappings of the I/O queues 162, 164 as queue metadata 258 in storage 251, in one embodiment.

In step 306, the host 140 and memory controller 122 use the I/O queues 162, 164 to process commands. The host 140 may place commands (e.g., read, write) on the SQs 162. The memory controller 122 may access the commands and execute them. The memory controller 122 may read data from the memory structure 126 and DMA the data to host memory 160, for one embodiment of a read command. The memory controller 122 may access data from host memory 160 and write that data to the memory structure, for one embodiment of a write command. The memory controller 122 may place command responses (for the commands the host placed on the SQs 162) on the CQs 164.

Step 308 includes the host 140 triggering a partial reset of the memory controller 122. In one embodiment, the host 140 sends a hardware reset to the memory controller 122. The host 140 writes a specific register in the memory controller 122 to trigger the partial reset, one embodiment. Writing to a specific register in the memory controller 122 is one example of a hardware signal, but other hardware signals could be used. The host 140 sends a command (e.g., partial reset command) to the memory controller 122 to trigger the partial reset, in one embodiment. This partial reset command may be placed on the admin submission queue 152, as one example. The partial reset command is a vendor-specific command in a memory access protocol, in one embodiment. The partial reset command is a vendor-specific command in an NVMe protocol, in one embodiment.

The host 140 may determine to trigger the partial reset for a variety of reasons. It may be that the memory controller 122 reported an error to the host 140. The host 140 may determine that a partial reset of the memory controller 122 may facilitate recovery from the error. Moreover, by performing partial reset, time is saved initializing the memory controller 122. For example, the host 140 and memory controller 122 need not go through a time consuming process of the host sending the address of each I/O queue 162, 164 to the memory controller 122.

Note that in addition to triggering the partial reset of the memory controller 122, the host 140 may perform various actions as a part of the partial reset of the memory controller 122. Those actions may include clearing content of the I/O queues 162, 164. Clearing content of the I/O queues may include setting the memory at the memory addresses of the I/O queues to a default value (such as all zeroes). The host 140 may also clear any pending interrupts. The host 140 may also preserve a mapping between interrupt vectors and CQs. Further details of one embodiment of actions performed by a host 140 are shown and described with respect to FIG. 9.

Figure 8:
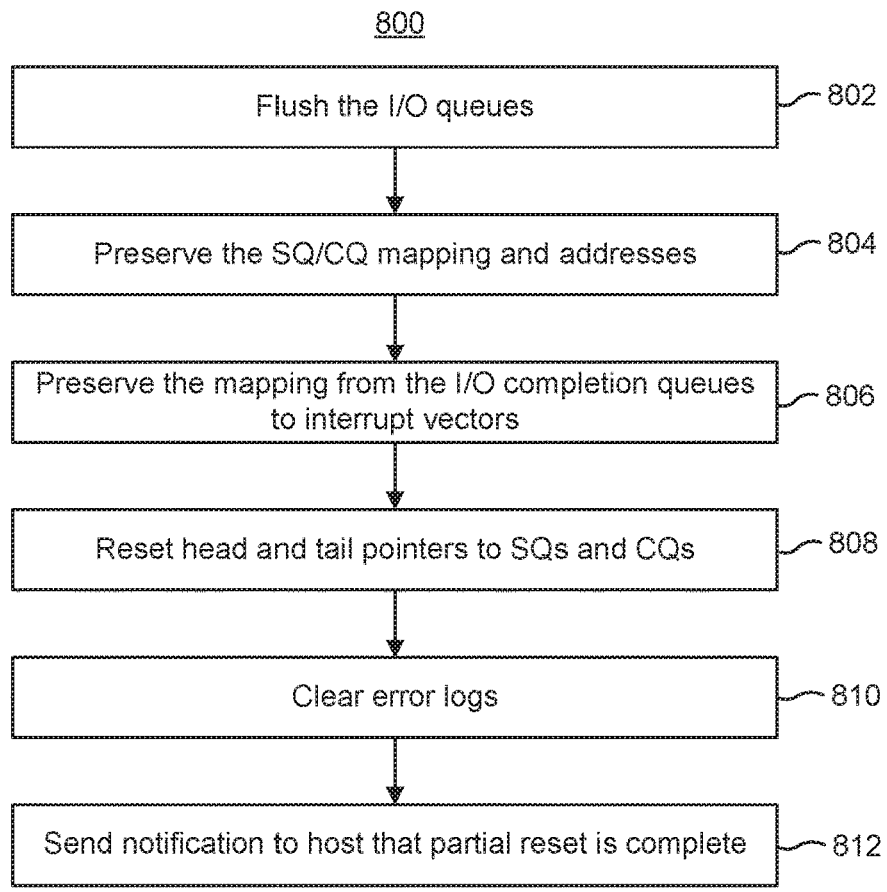
FIG. 8 is a flowchart of one embodiment of a process of actions performed by a memory controller in response to a partial reset.

Step 310 includes the memory controller 122 executing a partial reset in response to the trigger from the host 140. Step 310 may include resetting head pointers and tail pointers of I/O queues 162, 164. In one embodiment, the memory controller 122 resets doorbell registers to default values. For example, the memory controller 122 may reset submission queue tail doorbell registers and completion queue head doorbell registers to default values. The memory controller 122 may also reset head pointers and tail pointers in queue metadata 258. Further details of one embodiment of step 310 are depicted in FIG. 8.

Note that in one embodiment, the memory controller 122 persists the I/O queue addresses across the partial reset. To persist the I/O queue addresses across the partial reset means that the memory controller 122 uses the same addresses for the I/O queues 162, 164 before and after the partial reset of the memory controller 122. The memory controller 122 preserves the memory addresses for the I/O queues 162, 164 in the queue metadata 258 after the partial reset, which allows the memory controller 122 to persist the I/O queue addresses across the partial reset, in one embodiment.

Note that in one embodiment, the memory controller 122 persists the mapping between each SQ 162 and the corresponding CQ 164 across the partial reset. To persist the mappings across the partial reset means that the memory controller 122 will uses the same mappings before and after the partial reset of the memory controller 122. The memory controller 122 preserves the mappings in the queue metadata 258 after the partial reset, which allows the memory controller 122 to persist the mappings across the partial reset, in one embodiment.

By the memory controller 122 persisting the I/O queue addresses and/or mappings, time is saved. In one embodiment, the memory controller 122 stores a copy of the I/O queue addresses and mappings in non-volatile memory such that the I/O queue addresses and mappings are preserved in the event power is lost.

In one embodiment, the memory controller 122 persists an interrupt coalescing feature across the partial reset. The interrupt coalescing feature establishes rules for how/when the non-volatile memory controller 122 is to write to an interrupt vector to indicate to the host system 140 that the non-volatile memory controller 122 has placed one or more command responses on a CQ 164. To persist the interrupt coalescing feature across the partial reset means that the memory controller 122 uses the same rules for interrupt coalescing both prior to and after the partial reset. In one embodiment, the memory controller 122 preserves values that define the rules for interrupt coalescing. The host 140 may provide the rules during memory controller initialization. The memory controller 122 may preserve the rules for interrupt coalescing in storage 251 after the partial reset.

Figure 10:
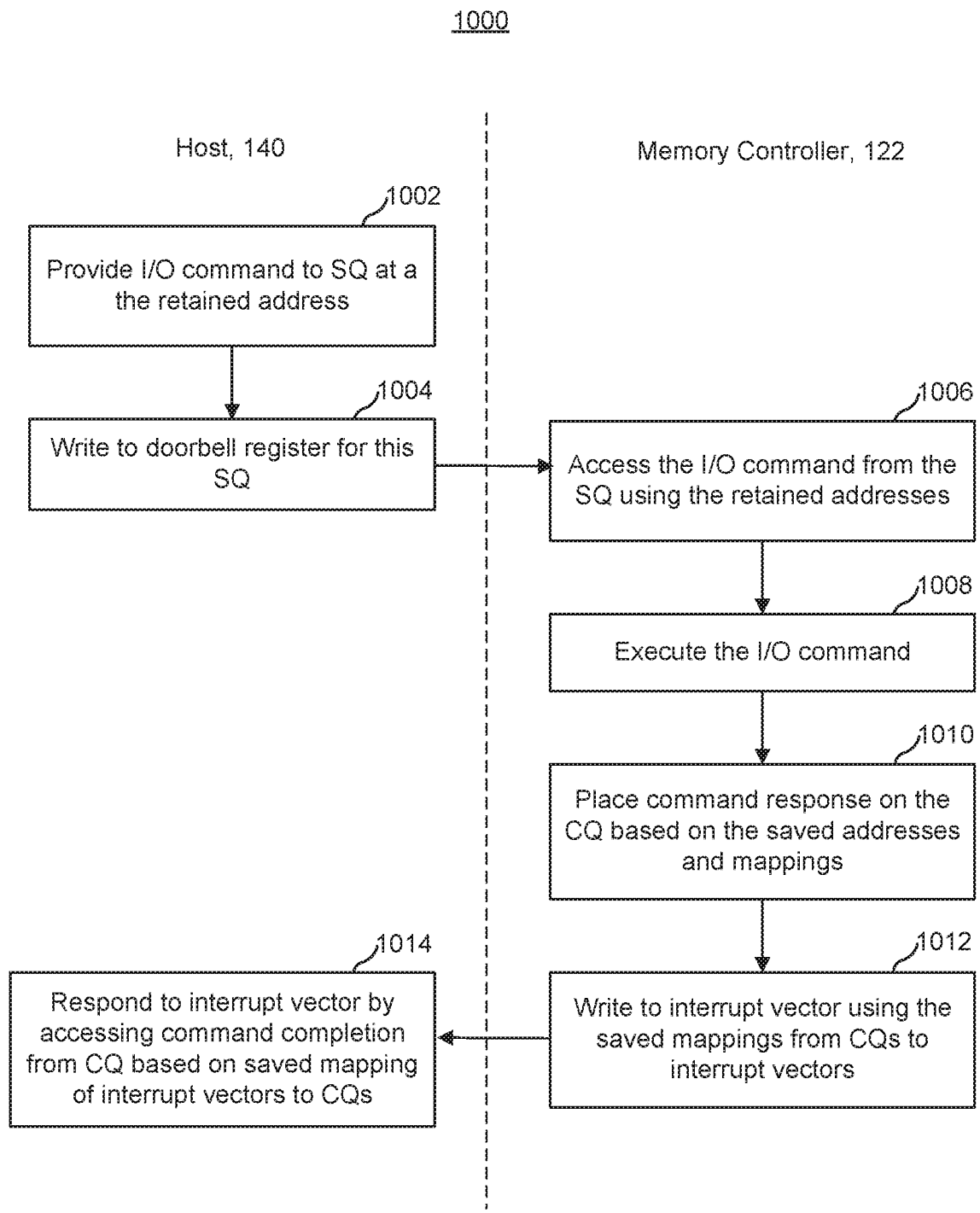
FIG. 10 is a flowchart of one embodiment of a process of a host and memory controller using I/O queues after a partial reset of the memory controller.

Step 312 includes the host 140 and memory controller 122 using the I/O queues 162, 164 to process commands. The memory controller 122 may use the persisted addresses of the I/O queue 162, 164. The memory controller 122 may use the persisted mapping between each SQ 162 and the corresponding CQ 164. FIG. 10 provides further details of one embodiment of step 312. Hence, the memory controller 122 is able to begin processing I/O commands after the partial reset without the need of a lengthy initialization process. For example, there is no need for the host to re-send the addresses of the I/O queues 162, 164 to the memory controller 122. Also, there is no need for the host to re-send the mapping between SQs 162 and CQs 164 to the memory controller 122. This may eliminate the need for the host to send many commands to the memory controller 122.

Figure 4:
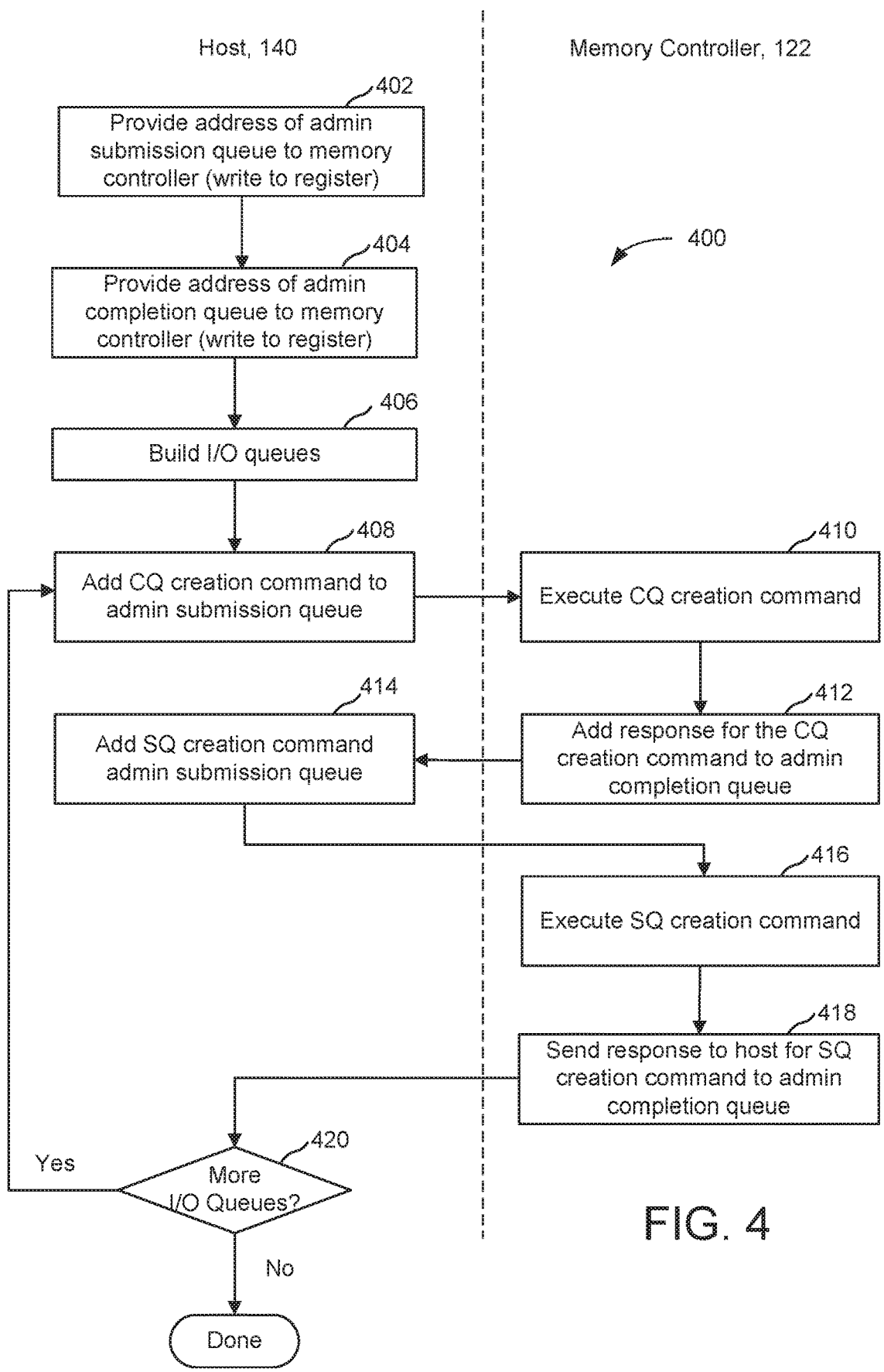
FIG. 4 is a flowchart of one embodiment of a process of creating I/O queues during initialization of a memory controller.

FIG. 4 is a flowchart of one embodiment of a process 400 of creating I/O queues 162, 164 during initialization of a memory controller 122. Process 400 may be used during steps 302 and 304 of process 300. Process 400 is divided between actions performed by host 140 and those performed by the memory controller 122. Note that process 400 describes steps that are consistent with a conventional memory controller initialization. For example, process 400 is consistent with initialization in the NVMe protocol. Embodiments of a partial reset provide for a much faster initialization of a memory controller than process 400 by preserving certain I/O queue metadata after the partial reset.

Step 402 includes the host 140 providing addresses of an admin submission queue 152 to the memory controller 122. In one embodiment, the host 140 writes the address to one of the registers 252 in the memory system 100. The address of the admin submission queue 152 may be an address in host memory 160. However, the admin submission queue 152 is not required to be located in host memory 160. In one embodiment, the admin submission queue 152 is located in memory on the memory system 100 (e.g., RAM 122*b*).

Step 404 includes the host 140 providing addresses of an admin completion queue 154 to the memory controller 122. In one embodiment, the host 140 writes the addresses to one of the registers 252 in the memory system 100. The address of the admin completion queue 154 may be an address in host memory 160. However, the admin completion queue 154 is not required to be located in host memory 160. In one embodiment, the admin completion queue 154 is located in memory on the memory system 100 (e.g., RAM 122*b*).

Figure 5:
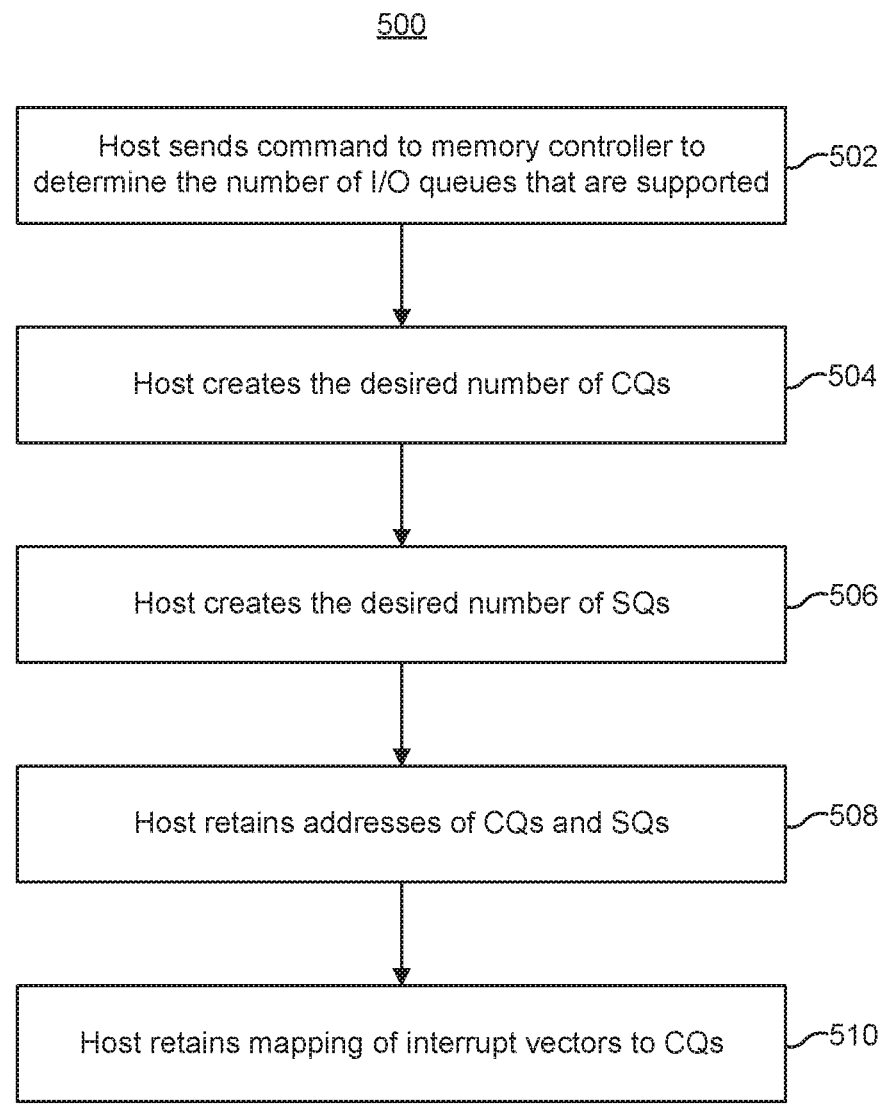
FIG. 5 is a flowchart of one embodiment of a process of one embodiment of a host building I/O queues.

Step 406 includes the host 140 building I/O queues 162, 164. Step 406 refers to the host 140 allocating memory for the I/O queues 162, 164, and saving I/O queue metadata 258. Memory is allocated in host memory 160 for the I/O queues 162, 164, in one embodiment. Memory is allocated in storage 251 for the I/O queues 162, 164, in one embodiment. FIG. 5 provides further details of one embodiment of the host 140 building I/O queues 162, 164.

Step 408 includes the host 140 providing a CQ creation command on the admin submission queue 152. The CQ creation command indicates that the host 140 has allocated memory for a CQ 164. The CQ creation command also includes metadata for the CQ 164. Further details of one embodiment of step 408 are discussed in FIG. 6. In one embodiment, the CQ creation command is an NVMe create I/O completion queue command.

Step 410 includes the memory controller 122 executing the CQ creation command. In one embodiment, the memory controller 122 stores queue metadata 258 in storage 251 in step 410. The queue metadata 258 may include and identifier of the CQ 164, one or more addresses for the CQ, and an interrupt vector for the CQ. The interrupt vector specifies an interrupt vector to which the memory controller 122 is to write in response to placing one or more command responses on the CQ. Further details of one embodiment of step 410 are discussed in FIG. 6.

Step 412 includes the memory controller 122 adding a response for the CQ creation command to the admin completion queue 154. The host 140 then processes the response.

Step 414 includes the host 140 providing an SQ creation command on the admin submission queue 152. The SQ creation command indicates that the host 140 has allocated memory for an SQ 162. The SQ creation command also includes metadata for the SQ 162. Further details of one embodiment of step 408 are discussed in FIG. 7. In one embodiment, the SQ creation command is an NVMe create I/O submission queue command.

Step 416 includes the memory controller 122 executing the SQ creation command. In one embodiment, the memory controller 122 stores queue metadata 258 in storage 251 in step 416. The queue metadata 258 may include: an identifier of the SQ 162, one or more addresses for the SQ 162, and an identifier of a CQ 164 that is mapped to the SQ. Further details of one embodiment of step 410 are discussed in FIG. 7.

Step 418 includes the memory controller 122 adding a response for the CQ creation command to the admin completion queue 154. The host 140 then processes the response.

Step 420 includes the host 140 determining whether there are more I/O queues 162, 164 to build. If so, the process 400 returns to step 408. Note that there could be many I/O queues to build. Hence, process 400 could be quite time consuming given that a considerable time may be consumed for the execution of each CQ creation command, as well as for the execution of each SQ completion command. However, embodiments of a partial reset of a memory controller avoid at least some of the steps of process 400. For example, at least steps 408-420 are avoided in one embodiment of a partial reset, which may save a substantial amount of time.

FIG. 5 is a flowchart of one embodiment of a process 500 of one embodiment of a host 140 building I/O queues 162, 164. The process 500 may be used during step 306 of process 300.

Step 502 includes the host 140 sending a command to the memory controller 122 to determine how many I/O queues are supported by the memory controller 122. The host may place the command on the admin submission queue 152. In one embodiment, the host 140 sends an NVMe get features command.

Step 504 includes the host 140 creating a desired number of CQs 164 in memory. Creating the CQ 164 includes allocating memory for the CQ. For example, the host could use a command such as "malloc," which is commonly used to perform dynamic memory allocations. Use of "malloc" is one example of memory allocation but is not required. Step 504 may also include initializing the contents of the memory to a default value, such as all zeroes. It is not required that a CQ 164 be contiguous in memory. Thus, a given CQ 164 might be formed from a number of "buffers." For example, a CQ 164 could be formed from a number of 4K buffer, which might or might not be contiguous in memory. In one embodiment, the host 140 allocates a portion of the host memory 160 for the CQs 164. In one embodiment, the host 140 allocates a portion of storage 251 for each of the CQs 164.

Step 506 includes the host 140 creating a desired number of SQs 162 in memory. Step 506 may be similar to creating the desired number of CQs 164. Creating the SQs 162 includes allocating memory for the SQ. It is not required that an SQ 162 be contiguous in memory. In one embodiment, the host 140 allocates a portion of the host memory 160 for the SQs 162. In one embodiment, the host 140 allocates a portion of storage 251 for each of the SQs 162.

Step 508 includes the host 140 retaining addresses of the I/O queues 162, 164 in the I/O queue metadata 166. Step 508 may also include the host 140 retaining a mapping from each of the SQs 162 to a corresponding CQ 164.

Step 510 includes the host 140 retaining a mapping of interrupt vectors to SQs 164. Note that a given interrupt vector could be associated with more than one CQ 164. In one embodiment, the interrupt vectors are MSI (Message Signaled Interrupts). In one embodiment, the interrupt vectors are MSI-X.

Figure 6:
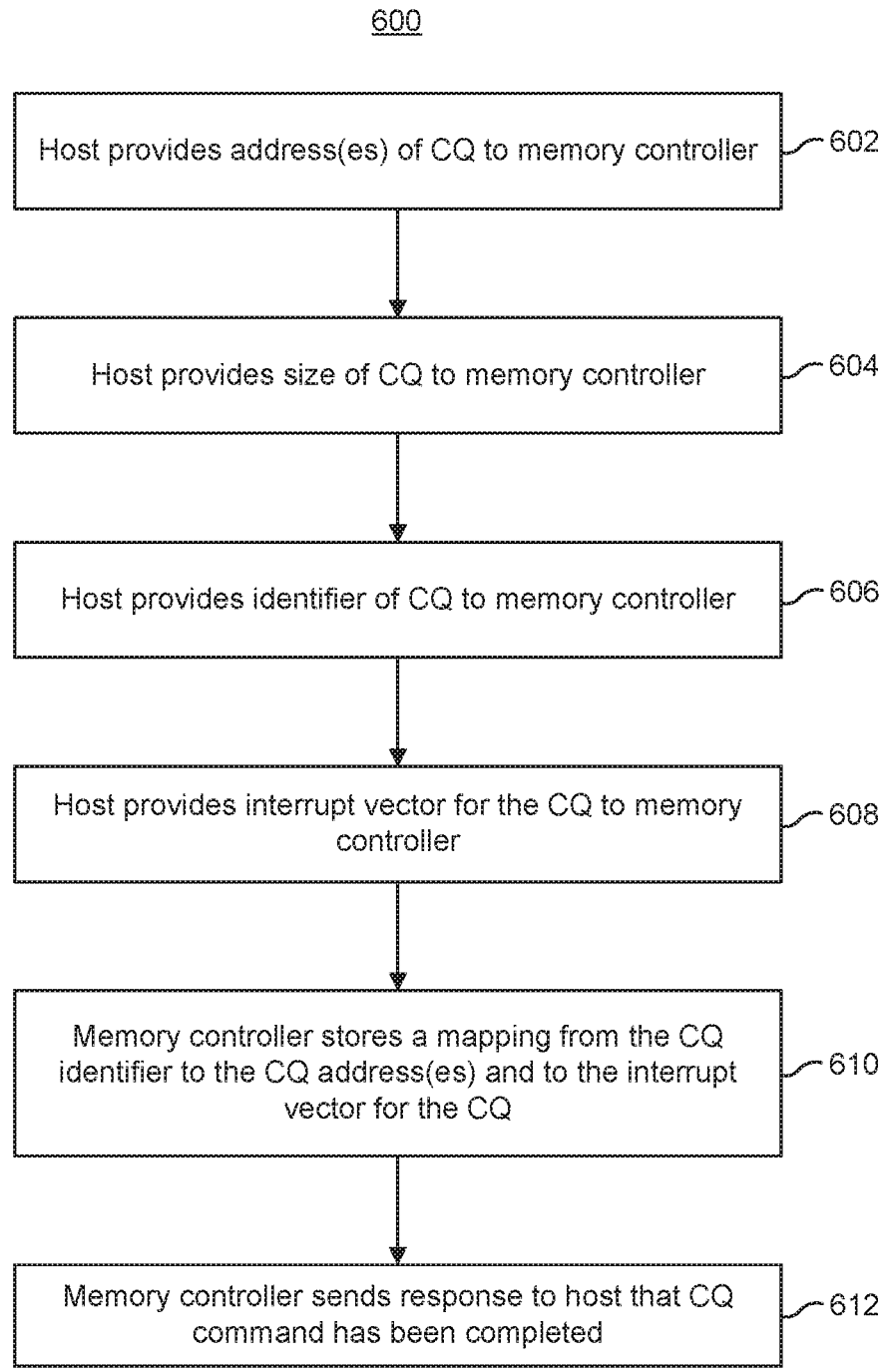
FIG. 6 is a flowchart of one embodiment of a process that includes a host providing metadata for a command submission queue (SQ) to a memory controller.

FIG. 6 is a flowchart of one embodiment of a process 600 that includes a host 140 providing metadata for an SQ 164 to a memory controller 122. The process 600 may be used during one embodiment of steps 408-412 of process 400. Note that process 600 describes processing for one CQ 164.

Step 602 includes the host 140 providing one or more addresses of a CQ 164 to a memory controller 122. Step 604 includes the host 140 providing the size of the CQ 164 to the memory controller 122. Step 606 includes the host 140 providing an identifier of the CQ 164 to the memory controller. Step 608 includes the host 140 providing an interrupt vector for the CQ 164 to the memory controller 122. Steps 602-608 are one embodiment of step 408. In one embodiment, the host 140 provides an NVMe create I/O completion queue command to the admin submission queue 152 to implement steps 602-608.

Step 610 includes the memory controller 122 storing the metadata for the CQ 164 as queue metadata 258 in storage 251. Thus, the memory controller 122 may store: 1) size of the CQ 164; 2) an identifier for the CQ 164; 3) one or more addresses of the CQ 164; and 4) an interrupt vector for the CQ 164. In one embodiment, the memory controller 122 stores a copy of the metadata for the CQ 164 in non-volatile memory such that the metadata for the CQ 164 is preserved in the event power is lost. Step 610 is one embodiment of step 410 of process 400.

Step 612 includes the memory controller 122 sending a response to the host 140 that CQ command has been completed. In one embodiment, the memory controller 122 puts a command response to the NVMe create I/O completion queue command onto the admin completion queue 154. Step 612 is one embodiment of step 412 of process 400.

Figure 7:
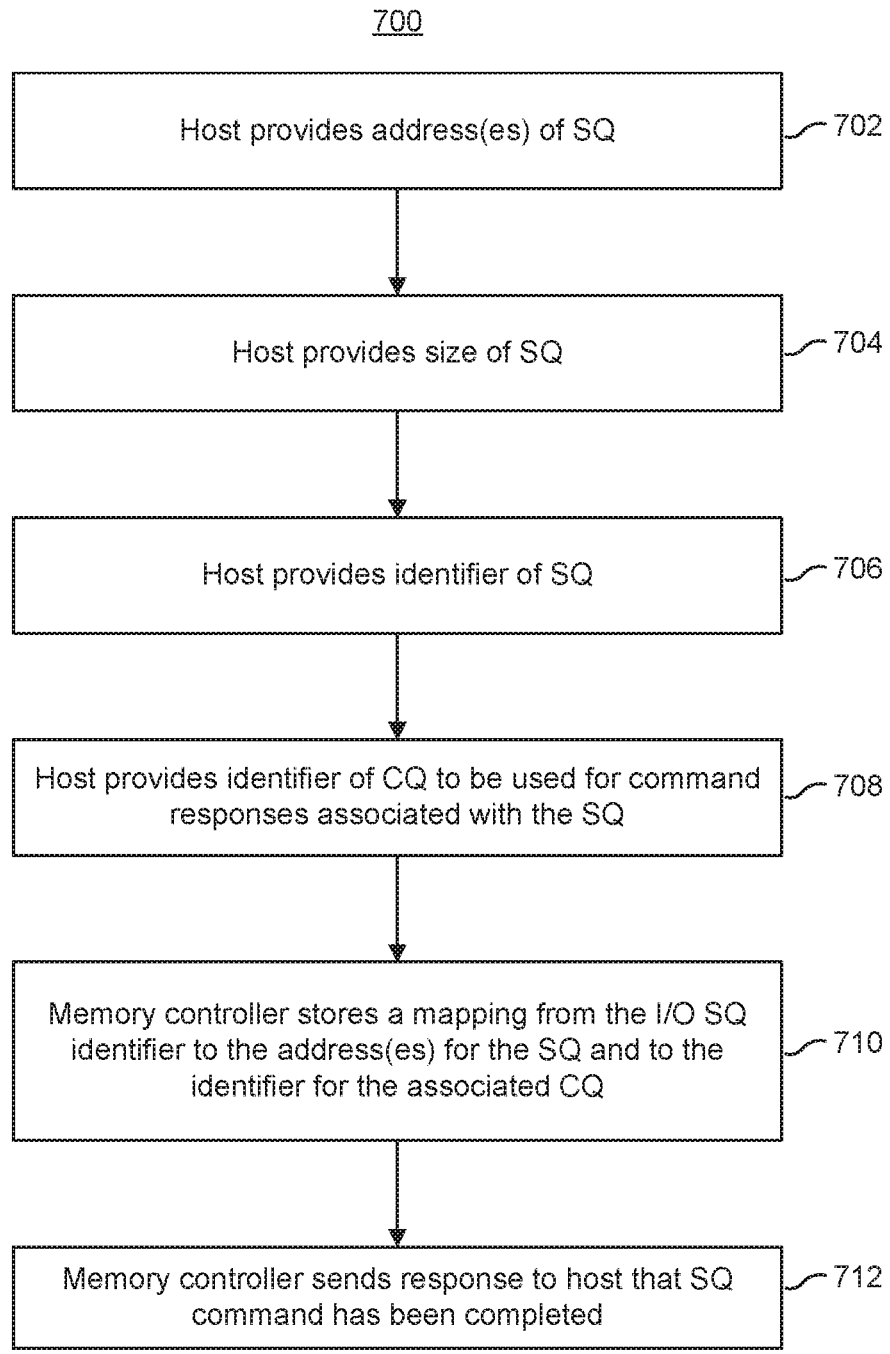
FIG. 7 is a flowchart of one embodiment of a process that includes a host providing metadata for a command completion queue (CQ) to a memory controller.

FIG. 7 is a flowchart of one embodiment of a process 700 that includes a host 140 providing metadata for an SQ 162 to a memory controller 122. The process 700 may be used during one embodiment of steps 416-418 of process 400. Note that process 700 describes processing for one SQ 162.

Step 702 includes the host 140 providing one or more addresses of an SQ 162 to a memory controller 122. Step 704 includes the host 140 providing the size of the SQ 162 to the memory controller 122. Step 706 includes the host 140 providing an identifier of the SQ 162 to the memory controller. Step 708 includes the host 140 providing an identifier of a CQ 164 to be used for command completions associated with the SQ 162 to the memory controller 122. Steps 702-708 are one embodiment of step 416. In one embodiment, the host 140 provides an NVMe create I/O submission queue command to the admin submission queue 152 to implement steps 702-708.

Step 710 includes the memory controller 122 storing the metadata for the SQ 162 as queue metadata 258 in storage 251. Thus, the memory controller 122 may store: 1) size of the SQ 162; 2) an identifier for the SQ 162; 3) one or more addresses of the SQ 162; and 4) an identifier of a CQ 164 to be used for command completions associated with the SQ 162. In one embodiment, the memory controller 122 stores a copy of the metadata for the SQ 162 in non-volatile memory such that the metadata for the SQ 162 is preserved in the event power is lost. Step 710 is one embodiment of step 416 of process 400.

Step 712 includes the memory controller 122 sending a response to the host 140 that SQ command has been completed. In one embodiment, the memory controller 122 puts a command response to the NVMe create I/O submission queue command onto the admin completion queue 154. Step 712 is one embodiment of step 418 of process 400.

FIG. 8 is a flowchart of one embodiment of a process 800 of actions performed by a memory controller 122 in response to a partial reset. Process 800 may be performed by the memory controller 122 during one embodiment of step 310 of process 300.

Step 802 includes flushing the I/O queues 162, 164. Flushing the I/O queues 162, 164 includes committing to non-volatile memory 126 all commands that were completed prior to the partial reset, in one embodiment. For example, if the memory controller 122 placed a command completion on a CQ 164 for a write command, then the memory controller 122 commits the data for that write command to the memory structure 126. Note that in some cases, the memory controller 122 might provide a command completion for a write command prior to having committed the data to the memory structure. The memory controller 122 is not required to execute any commands on the SQs 162 that have not yet been completed, in one embodiment. Thus, the memory controller 122 may ignore commands on the SQs 162 that have not yet been completed, in one embodiment.

Step 804 includes the memory controller 122 preserving the SQ/CQ mapping and addresses. The SQ/CQ mapping refers to the mapping between an SQ 162 and a CQ 164. The addresses refer to the memory addresses of the SQs 162 and CQs 164. Note that by preserving the SQ/CQ mapping and addresses the SQ/CQ mapping and addresses may be persisted across the partial reset.

In one embodiment, the memory controller 122 preserves at least some of the queue metadata 258 in order to persist the SQ/CQ mapping and addresses across the partial reset. In some cases, the memory controller 122 preserves the SQ/CQ mapping and addresses in non-volatile memory in the event that power to non-volatile memory (e.g., RAM 122b) is lost during or near in time to the partial reset. Note that the memory controller 122 may have stored the SQ/CQ mapping and addresses during one embodiment of step 310, 610, and/or 710. However, note that it is not required that the SQ/CQ mapping and addresses be preserved in non-volatile memory. In some embodiments, the partial reset does not result in power loss to volatile memory such as RAM 122b. Hence, the SQ/CQ mapping and addresses may be preserved in RAM 122b, in one embodiment.

Step 806 includes the memory controller 122 preserving the mapping from the CQs 164 to the interrupt vectors. Step 806 may include preserving the mapping from the CQs 164 to the interrupt vectors in storage 251. The interrupt vectors are persevered in registers 252, in one embodiment. The interrupt vectors may be preserved elsewhere, such as in memory cells in the memory structure 126.

Step 808 includes the memory controller 122 resetting head pointers and tail pointers of SQs 162 and CQ 164 to default values. This may include resetting head pointers and tail pointers of SQs 162 to default values, as well as resetting head pointers and tail pointers of CQs 164 to default values. Step 808 may include resetting doorbell registers to a default state, such as all zeroes. In one embodiment, the memory controller 122 resets an NVMe submission queue tail doorbell register. In one embodiment, the memory controller 122 resets an NVMe completion queue head doorbell register. Step 808 may include resetting storage other than the doorbell registers.

Step 810 includes memory controller 122 clearing error logs. For example, the memory controller 122 may have one or more log pages that may be used to describe error information. Such log page(s) may be obtained by the host 140. For example, in NVMe, the host 140 may issue a Get Log Page command to obtain a log page. Thus, step 810 may include the memory controller 122 clearing a log page or other type of error log.

Step 812 includes the memory controller 122 sending a notification to the host 140 that the partial reset is complete. In one embodiment, the memory controller 122 places a command completion on the admin completion queue 154. However, it is not required that the admin completion queue 154 be used.

Thus, after process 800, the memory controller 122 preserves some I/O queue metadata 258. However, some aspects related to the I/O queues have been reset. For example, the doorbell registers may be reset. Also head pointers and tail pointers of I/O queues 162, 164 may be reset. Also, outstanding commands on the SQs 162 may be ignored. Note that the host 140 may clear the SQs 162 (as will be described in connection with FIG. 9).

Figure 9:
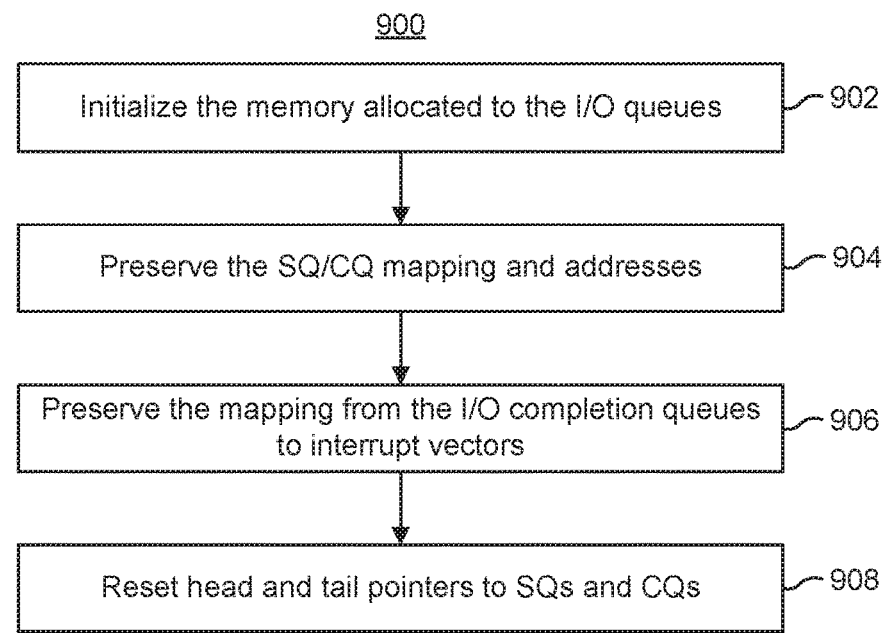
FIG. 9 is a flowchart of one embodiment of a process of actions performed by a host when performing a partial reset of a memory controller.

FIG. 9 is a flowchart of one embodiment of a process 900 of actions performed by a host 140 in connection with triggering a partial reset of a memory controller 122. Steps of process 900 may be considered to be part of the partial reset of the memory controller 122. The steps of process 900 are described in a certain order as a matter of convenience of explanation, but could occur in a different order. The host 140 may perform steps of process 900 after the host receives the notification from the memory controller 122 that the memory controller 122 has completed the partial reset (e.g., after step 810 of process 800). However, note that the host could perform some steps of process 900 prior to receiving the notification from memory controller.

Step 902 includes the host 140 initializing the memory that was allocated for the I/O queues 162, 164. Initializing the memory refers to establishing the content of the memory to a certain value. The host 140 may set the memory to some default value, such as all zeroes. Initializing the memory may be used to clear or reset the content of the I/O queues 162, 164.

Step 904 includes the host 140 preserving the SQ/CQ mapping and addresses. For example, the host 140 may preserve I/O queue metadata 166.

Step 906 includes the host 140 preserving the mapping from the CQs 164 to the interrupt vectors. For example, the host 140 may preserve I/O queue metadata 166. The host 140 also clears any existing interrupts from the memory controller 122, in one embodiment.

Step 908 includes the host 140 resetting head pointers and tail pointers of SQs 162 and CQ 164 to default values. Head pointers and tail pointers of SQs 162 and CQ 164 in the I/O queue metadata 166 are reset in one embodiment. Step 908 may include resetting head pointers and tail pointers of SQs 162 to default values, as well as resetting head pointers and tail pointers of CQs 164 to default values.

Step 908 may include resetting phase tags associated with the I/O queues 162, 164. Phase tags may be included with a queue entry in accordance with an NVMe protocol to track which entries on the CQs 164 have been consumed by the host 140. Since the contents of the CQs 164 (as well as SQs 162) are cleared in step 902, the phase tags may also be reset. Resetting the phase tags placing them into a default state that corresponds to an empty SQ 164, in one embodiment.

FIG. 10 is a flowchart of one embodiment of a process 1000 of a host 140 and memory controller 122 using I/O queues 162, 164 after a partial reset of the memory controller 122. Process 1000 describes processing one I/O command. Process 1000 is one embodiment of step 312 of process 300.

Step 1002 includes the host 140 providing an I/O command to an SQ 162. This might be a read or write of memory cells in memory structure 126, for example. The host 140 uses the address of the SQ 162 which it retained after the partial reset of the memory controller 122. Note that content of this SQ 162 was cleared in one embodiment of the partial reset of the memory controller 122. The host 140 may also use a tail pointer for this SQ 162 to know which slot to place the I/O command.

Step 1004 includes the host 140 writing to a doorbell register for this SQ 162. Note that this doorbell register was reset in one embodiment of the partial reset of the memory controller 122. The host 140 places information in the doorbell register that corresponds to the slot on the SQ 162 into which the I/O command was placed, in one embodiment. In one embodiment, the host places a tail pointer in the doorbell register. The tail pointer is an index that specifies a slot (or entry) of the SQ 162, in one embodiment. Note that there may be a unique doorbell register for each SQ 162, such that the doorbell register itself may serve to identify the queue number. However, the memory controller 122 may need to rely on the persisted address of the SQ 162 to be able to locate the SQ 162 in memory. In one embodiment, the host writes to an NVMe submission queue tail doorbell register to provide the new tail pointer for this CQ 162.

Step 1006 includes the memory controller 122 accessing the I/O command from the SQ 162. As just noted, the memory controller 122 may use the memory address of the SQ 162 which it preserved after the partial reset of the memory controller 122 to locate the I/O command. The memory controller 122 may also use a tail pointer for the SQ 162. As noted, the tail pointer may be in the doorbell register.

Note that in some cases, the host places more than one I/O command on the SQ 162. In this case, the memory controller 122 may determine how many I/O commands were placed on the SQ 162 by comparing the present value of the tail pointer with a previous value of the tail pointer. If this is the very first use of this SQ 162 after a partial reset, then the previous value of the tail pointer is the default value that was established during the partial reset, in one embodiment.

Step 1008 includes the memory controller 122 executing the I/O command. For example, the memory controller 122 reads from or writes to non-volatile memory in structure 126. Step 1008 may include a data transfer between the host memory 160 and the memory controller 122.

Step 1010 includes the memory controller 122 placing a response to the I/O command on the CQ 164 that is mapped to the SQ 162. The memory controller 122 uses the mappings which it preserved after the partial reset of the memory controller 122 to determine the correct CQ 164. The memory controller 122 may also use the address of the SQ 164, which it preserved after the partial reset. Moreover, the memory controller 122 may maintain a tail pointer for the SQ 164 to know which slot on the CQ 164 to use for the command response.

Step 1012 includes the memory controller 122 writing to an interrupt vector to notify the host 140 about the command response. The memory controller 122 uses the mappings which it preserved after the partial reset of the memory controller 122 to determine the correct interrupt vector. The interrupt vector may be an MSI or MSI-X, for example.

Step 1014 includes the host 140 responding to the interrupt vector by accessing the command completion from the CQ 164. The host 140 uses the mappings from interrupt vectors to SQs 164 which it retained after the partial reset of the memory controller 122. The host may write to a doorbell register after it processes the response. In one embodiment, the host writes to an NVMe completion queue head doorbell register to provide the new header pointer for this SQ 164.

A first embodiment disclosed herein includes an apparatus comprising: a memory structure having non-volatile memory cells; and a non-volatile memory controller in communication with the memory structure. The non-volatile memory controller is configured to receive, from a host, memory addresses of I/O (Input/Output) submission queues and memory addresses of I/O completion queues. The non-volatile memory controller is configured to receive, from the host, a mapping between each I/O submission queue and a corresponding I/O completion queue. The non-volatile memory controller is further configured to reset, in response to a partial reset of the non-volatile memory controller: i) head pointers and tail pointers of the I/O submission queues; and ii) head pointers and tail pointers of the I/O completion queues. The non-volatile memory controller is further configured to persist the following across the partial reset of the non-volatile memory controller: i) the memory addresses of the I/O submission queues; ii) the memory addresses of the I/O completion queues; and iii) the mapping between each I/O submission queue and the corresponding I/O completion queue.

In a second embodiment, and in furtherance of the first embodiment, the apparatus further comprises further comprising the host. The host is configured to: trigger the partial reset of the non-volatile memory controller; and clear content of the I/O submission queues and content of the I/O completion queues as a part of the partial reset of the non-volatile memory controller.

In a third embodiment, and in furtherance of the either the first or the second embodiment, the host is further configured to: after the partial reset, preserve the mapping between each I/O submission queue and the corresponding I/O completion queue; and after the content of the I/O submission queues and the content of the I/O completion queues has been cleared, place I/O commands on the I/O submission queues.

In a fourth embodiment, and in furtherance of the any of the first to third embodiments, the apparatus further comprises the further comprises the host, which is configured to: write to a register in the non-volatile memory controller to trigger the partial reset of the non-volatile memory controller.

In a fifth embodiment, and in furtherance of the any of the first to third embodiments, the apparatus further comprises the further comprises the host, which is configured to: provide the non-volatile memory controller with a vendor-specific command to trigger the partial reset of the non-volatile memory controller.

In a sixth embodiment, and in furtherance of the any of the first to fifth embodiments, the apparatus further comprises the further comprises the host, which is configured to: prior to the partial reset of the non-volatile memory controller, allocate host memory for the I/O submission queues; and after the partial reset of the non-volatile memory controller, the I/O completion queues; and preserve the allocation of the host memory for the I/O submission queues and the I/O completion queues.

In a seventh embodiment, and in furtherance of the any of the first to fifth embodiments, the apparatus further comprises the further comprises the host, which is configured to: prior to the partial reset of the non-volatile memory controller, allocate memory in the non-volatile memory controller for the I/O submission queues and the I/O completion queues; and after the partial reset of the non-volatile memory controller, preserve the allocation of the memory in the non-volatile memory controller for the I/O submission queues and the I/O completion queues.

In an eighth embodiment, and in furtherance of the any of the first to seventh embodiments, the non-volatile memory controller is further configured to preserve an interrupt coalescing feature after the partial reset of the non-volatile memory controller.

In a ninth embodiment, and in furtherance of the any of the first to eighth embodiments, the non-volatile memory controller is further configured to: prior to the partial reset, access the I/O submission queues and the I/O completion queues to process I/O commands from the host to access the non-volatile memory cells; and after the partial reset, access the I/O submission queues and the I/O completion queues to process I/O commands from the host to access the non-volatile memory cells based on: i) the persisted memory addresses of the I/O completion queues; ii) the persisted memory addresses of the I/O submission queues; and iii) the persisted mapping between each I/O submission queue and the corresponding I/O completion queue.

One embodiment includes a method of operating a non-volatile storage device. The method comprises: during an initialization of a non-volatile memory controller of the non-volatile storage device: receiving memory addresses of I/O (Input/Output) submission queues and memory addresses of I/O completion queues; and receiving a mapping between each I/O submission queue and a corresponding I/O completion queue. The method further comprises: accessing the I/O submission queues and the I/O completion queues to process I/O commands to access non-volatile memory in the non-volatile storage device; and in response to a partial reset of the non-volatile memory controller, clearing head pointers and tail pointers of the I/O submission queues and head pointers and tail pointers of the I/O completion queues. The method further comprises: after the partial reset: preserving the memory addresses of the I/O completion queues; preserving the memory addresses of the I/O submission queues; preserving the mapping between each I/O submission queue and the corresponding I/O completion queue; and accessing the I/O submission queues and the I/O completion queues to process I/O commands, the accessing based on: i) the preserved memory addresses of the I/O completion queues; ii) the preserved memory addresses of the I/O submission queues; and iii) the preserved mapping between each I/O submission queue and the corresponding I/O completion queue.

One embodiment includes a non-volatile storage device comprising: non-volatile memory cells, and memory controller means for controlling read and write access to the non-volatile memory cells. The non-volatile storage device comprises queue creating means for creating software I/O (Input/Output) submission queues and software I/O completion queues at addresses in memory, the queue creating means further for sending the memory controller means the memory addresses of the software I/O submission queues and the memory addresses of the software I/O completion queues, the queue creating means further for sending the memory controller means a mapping between each software I/O submission queue and a corresponding software I/O completion queue. The non-volatile storage device comprises partial reset triggering means for triggering a partial reset of the memory controller means after the memory addresses of the software I/O submission queues, the memory addresses of the software I/O completion queues, and the mapping between each software I/O submission queue and the corresponding software I/O completion queue have been sent to the memory controller means. The non-volatile storage device further comprises queue clearing means for clearing content of the software I/O submission queues and the software I/O completion queues as a part of the partial reset of the memory controller means. The memory controller means further comprises pointer resetting means for resetting head pointers and tail pointers of the software I/O submission queues and for resetting head pointers and tail pointers of the software I/O completion queues as a part of the partial reset. The memory controller means further comprises partial reset manager means for persisting the following across the partial reset of the memory controller means: i) the memory addresses of the software I/O submission queues; ii) the memory addresses of the software I/O completion queues, and iii) the mapping between each software I/O submission queue and the corresponding software I/O completion queue. The memory controller means further comprises command access means for accessing I/O commands from the software I/O submission queues after the content of the software I/O submission queues was cleared, the command access means further for accessing the I/O commands based on the persisted memory addresses of the software I/O submission queues. The memory controller means further comprises command response means for placing responses to the I/O commands after the content of the software I/O submission completion was cleared, the command response means further for placing the responses to the I/O commands based on the persisted memory addresses of the software I/O completion queues and the persisted mapping between each software I/O submission queue and the corresponding software I/O completion queue.

In one embodiment, the memory controller means comprises one or more of controller 122, processor 122c, RAM 122b, ROM 122a, front end module 208, back end module 210, command processor 240, controller initializer 250, buffer management/bus control 214, media management layer 238, registers 252, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the memory controller means could include other hardware and/or software.

In one embodiment, the queue creating means comprises one or more of host controller 180, host processor 150, host memory 160, queue manager 146, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the queue creating means could include other hardware and/or software.

In one embodiment, the partial reset triggering means comprises one or more of host controller 180, host processor 150, host memory 160, host-side partial reset manager 144, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the partial reset triggering means could include other hardware and/or software.

In one embodiment, the queue clearing means comprises one or more of host controller 180, host processor 150, host memory 160, host-side partial reset manager 144, queue manager 146, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the queue clearing means could include other hardware and/or software.

In one embodiment, the pointer resetting means comprises one or more of controller 122, processor 122c, RAM 122b, ROM 122a, MC side partial reset manager 254, queue metadata manager 256, registers 252, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the pointer resetting means could include other hardware and/or software.

In one embodiment, the partial reset manager means comprises one or more of controller 122, processor 122c, RAM 122b, ROM 122a, MC side partial reset manager 254, queue metadata manager 256, registers 252, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the partial reset manager means could include other hardware and/or software.

In one embodiment, the command access means comprises one or more of controller 122, processor 122c, RAM 122b, ROM 122a, front end module 208, command processor 240, command manager 242, registers 252, queue metadata manager 256, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the command access means could include other hardware and/or software.

In one embodiment, the command response means comprises one or more of controller 122, processor 122c, RAM 122b, ROM 122a, front end module 208, command processor 240, command manager 242, registers 252, queue metadata manager 256, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the command response means could include other hardware and/or software.

One embodiment includes system, comprising: A system, comprising: a communication interface; non-volatile memory cells; a non-volatile memory controller in communication with the non-volatile memory cells and the communication interface; and a host controller in communication with the non-volatile memory controller via the communication interface. The host controller is configured to: create I/O (Input/Output) submission queues and I/O completion queues at addresses in memory; send, to the non-volatile memory controller, the memory addresses of the I/O submission queues and the memory addresses of the I/O completion queues; send, to the non-volatile memory controller, a mapping between each I/O submission queue and a corresponding I/O completion queue; trigger a partial reset of the non-volatile memory controller, the partial reset instructing the non-volatile memory controller to maintain the memory addresses of the I/O submission queues, the memory addresses of the I/O completion queues, and the mapping between each I/O submission queue and a corresponding I/O completion queue after the partial reset; response to the partial reset of the non-volatile memory controller, clear content of the I/O submission queues and the I/O completion queues; and after the content of the I/O submission queues is cleared, submit I/O commands to the I/O submission queues.

Corresponding methods, systems and computer- or processor-readable storage devices which have executable code for performing the methods provided herein may also be provided.

For the purpose of this document, the numeric terms first (i.e., $1^{st}$) and second (i.e., $2^{nd}$) may be used to generally specify an order of when commands (e.g., write commands) are received by a memory controller from a host, as well as to generally specify an order in which data (e.g., $1^{st}$ and $2^{nd}$ data) is to be stored in non-volatile memory. However, it is noted that the term first (i.e., $1^{st}$) should not be interpreted as implying that nothing else precedes it.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

For purposes of this document, a "set" may include one or more elements.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. An apparatus comprising:
    a memory structure having non-volatile memory cells; and
    a non-volatile memory controller in communication with the memory structure and configured to:
        receive, from a host, memory addresses of I/O (Input/Output) submission queues and memory addresses of I/O completion queues;
        receive, from the host, a mapping between each I/O submission queue of the I/O submission queues and a corresponding I/O completion queue of the I/O completion queues;
        reset, in response to a partial reset of the non-volatile memory controller:

i) head pointers and tail pointers of the I/O submission queues; and
ii) head pointers and tail pointers of the I/O completion queues; and
persist the following across the partial reset of the non-volatile memory controller:
i) the memory addresses of the I/O submission queues;
ii) the memory addresses of the I/O completion queues; and
iii) the mapping between each I/O submission queue of the I/O submission queues and the corresponding I/O completion queue of the I/O completion queues.

2. The apparatus of claim 1, further comprising the host, wherein the host is configured to:
trigger the partial reset of the non-volatile memory controller; and
clear content of the I/O submission queues and content of the I/O completion queues as a part of the partial reset of the non-volatile memory controller.

3. The apparatus of claim 2, wherein the host is further configured to:
after the partial reset, preserve the mapping between each I/O submission queue of the I/O submission queues and the corresponding I/O completion queue of the I/O completion queues; and
after the content of the I/O submission queues and the content of the I/O completion queues has been cleared, place I/O commands on the I/O submission queues.

4. The apparatus of claim 1, further comprising the host, wherein the host is configured to:
write to a register in the non-volatile memory controller to trigger the partial reset of the non-volatile memory controller.

5. The apparatus of claim 1, further comprising the host, wherein the host is configured to:
provide the non-volatile memory controller with a vendor-specific command to trigger the partial reset of the non-volatile memory controller.

6. The apparatus of claim 1, further comprising the host, wherein the host is configured to:
prior to the partial reset of the non-volatile memory controller, allocate host memory for the I/O submission queues and the I/O completion queues; and
after the partial reset of the non-volatile memory controller, preserve the allocation of the host memory for the I/O submission queues and the I/O completion queues.

7. The apparatus of claim 1, further comprising the host, wherein the host is configured to:
prior to the partial reset of the non-volatile memory controller, allocate memory in the non-volatile memory controller for the I/O submission queues and the I/O completion queues; and
after the partial reset of the non-volatile memory controller, preserve the allocation of the memory in the non-volatile memory controller for the I/O submission queues and the I/O completion queues.

8. The apparatus of claim 1, wherein the non-volatile memory controller is further configured to:
preserve an interrupt coalescing feature after the partial reset of the non-volatile memory controller.

9. The apparatus of claim 1, wherein the non-volatile memory controller is further configured to:
prior to the partial reset, access the I/O submission queues and the I/O completion queues to process I/O commands from the host to access the non-volatile memory cells; and
after the partial reset, access the I/O submission queues and the I/O completion queues to process I/O commands from the host to access the non-volatile memory cells based on:
i) the persisted memory addresses of the I/O completion queues;
ii) the persisted memory addresses of the I/O submission queues; and
iii) the persisted mapping between each I/O submission queue of the I/O submission queues and the corresponding I/O completion queue of the I/O completion queues.

10. A method of operating a non-volatile storage device, the method comprising:
during an initialization of a non-volatile memory controller of the non-volatile storage device:
receiving memory addresses of I/O (Input/Output) submission queues and memory addresses of I/O completion queues; and
receiving a mapping between each I/O submission queue of the I/O submission queues and a corresponding I/O completion queue of the I/O completion queues;
accessing the I/O submission queues and the I/O completion queues to process I/O commands to access non-volatile memory in the non-volatile storage device;
in response to a partial reset of the non-volatile memory controller, clearing head pointers and tail pointers of the I/O submission queues and head pointers and tail pointers of the I/O completion queues; and
after the partial reset:
preserving the memory addresses of the I/O completion queues;
preserving the memory addresses of the I/O submission queues;
preserving the mapping between each I/O submission queue of the I/O submission queues and the corresponding I/O completion queue of the I/O completion queues; and
accessing the I/O submission queues and the I/O completion queues to process I/O commands, the accessing based on:
i) the preserved memory addresses of the I/O completion queues;
ii) the preserved memory addresses of the I/O submission queues; and
iii) the preserved mapping between each I/O submission queue of the I/O submission queues and the corresponding I/O completion queue of the I/O completion queues.

11. The method of claim 10, wherein:
the memory addresses of the I/O submission queues, the memory addresses of the I/O completion queues, and the mapping between each I/O submission queue of the I/O submission queues and the corresponding I/O completion queue of the I/O completion queues are preserved after the partial reset in memory that is accessible to the non-volatile memory controller.

12. The method of claim 11, wherein:
the memory addresses of the I/O submission queues, the memory addresses of the I/O completion queues, and the mapping between each I/O submission queue of the I/O submission queues and the corresponding I/O completion queue of the I/O completion queues are preserved after the partial reset in memory that is accessible to a host controller that performs the initialization of the non-volatile memory controller.

13. The method of claim 12, further comprising:
after the partial reset, resetting memory at the memory addresses of the I/O submission queues and the memory addresses of the I/O completion queues prior to submitting I/O commands to the I/O submission queues.

14. The method of claim 13, wherein accessing the I/O submission queues and the I/O completion queues to process I/O commands after the partial reset comprises:
after the memory at the I/O submission queues has been reset, accessing I/O commands from the I/O submission queues; and
after the memory at the I/O completion queues has been reset, placing responses to the I/O commands.

15. The method of claim 10, further comprising:
during the initialization of the non-volatile memory controller, establishing an interrupt coalescing feature; and
after the partial reset of the non-volatile memory controller, persisting the interrupt coalescing feature.

16. A non-volatile storage device comprising:
non-volatile memory cells;
memory controller means for controlling read and write access to the non-volatile memory cells;
queue creating means for creating software I/O (Input/Output) submission queues and software I/O completion queues at addresses in memory, the queue creating means further for sending the memory controller means the memory addresses of the software I/O submission queues and the memory addresses of the software I/O completion queues, the queue creating means further for sending the memory controller means a mapping between each software I/O submission queue of the software I/O submission queues and a corresponding software I/O completion queue of the software I/O completion queues;
partial reset triggering means for triggering a partial reset of the memory controller means after the memory addresses of the software I/O submission queues, the memory addresses of the software I/O completion queues, and the mapping between each software I/O submission queue of the software I/O submission queues and the corresponding software I/O completion queue of the software I/O completion queues have been sent to the memory controller means; and
queue clearing means for clearing content of the software I/O submission queues and the software I/O completion queues as a part of the partial reset of the memory controller means;
wherein the memory controller means further comprises:
pointer resetting means for resetting head pointers and tail pointers of the software I/O submission queues and for resetting head pointers and tail pointers of the software I/O completion queues as a part of the partial reset;
partial reset manager means for persisting the following across the partial reset of the memory controller means:
i) the memory addresses of the software I/O submission queues;
ii) the memory addresses of the software I/O completion queues, and
iii) the mapping between each software I/O submission queue of the software I/O submission queues and the corresponding software I/O completion queue of the software I/O completion queues;
command access means for accessing I/O commands from the software I/O submission queues after the content of the software I/O submission queues was cleared, the command access means further for accessing the I/O commands based on the persisted memory addresses of the software I/O submission queues; and
command response means for placing responses to the I/O commands after the content of the software I/O submission completion was cleared, the command response means further for placing the responses to the I/O commands based on the persisted memory addresses of the software I/O completion queues and the persisted mapping between each software I/O submission queue of the software I/O submission queues and the corresponding software I/O completion queue of the software I/O completion queues.

17. The non-volatile storage device of claim 16, wherein the partial reset triggering means is further for writing to a register to trigger the partial reset of the memory controller means.

18. The non-volatile storage device of claim 16, wherein the partial reset triggering means is further for placing a vendor-specific command on an admin submission queue to trigger the partial reset of the memory controller means.

19. A system, comprising:
a communication interface;
non-volatile memory cells;
a non-volatile memory controller in communication with the non-volatile memory cells and the communication interface; and
a host controller in communication with the non-volatile memory controller via the communication interface, the host controller configured to:
create I/O (Input/Output) submission queues and I/O completion queues at addresses in memory;
send, to the non-volatile memory controller, the memory addresses of the I/O submission queues and the memory addresses of the I/O completion queues;
send, to the non-volatile memory controller, a mapping between each I/O submission queue of the I/O submission queues and a corresponding I/O completion queue of the I/O completion queues;
trigger a partial reset of the non-volatile memory controller, the partial reset instructing the non-volatile memory controller to maintain the memory addresses of the I/O submission queues, the memory addresses of the I/O completion queues, and the mapping between each I/O submission queue of the I/O submission queues and a corresponding I/O completion queue of the I/O completion queues after the partial reset;
responsive to the partial reset of the non-volatile memory controller, clear content of the I/O submission queues and the I/O completion queues; and
after content of the I/O submission queues is cleared, submit I/O commands to the I/O submission queues.

20. The system of claim 19, wherein the non-volatile memory controller is configured to:
store the memory addresses of the I/O submission queues and the memory addresses of the I/O completion queues;
store the mapping between each I/O submission queue of the I/O submission queues and the corresponding I/O completion queue of the I/O completion queues;

in response to the partial reset of the non-volatile memory controller, reset head pointers and tail pointers of the I/O submission queues and the I/O completion queues;

persist the memory addresses of the I/O submission queues, the memory addresses of the I/O completion queues, and the mappings across the partial reset of the non-volatile memory controller; and after the partial reset:
- use the persisted memory addresses of the I/O submission queues to retrieve the I/O commands from the I/O submission queues; and
- use the persisted memory addresses of the I/O completion queues and the persisted mappings to place responses to the I/O commands on the I/O completion queues.

* * * * *